(12) United States Patent
Esenlik et al.

(10) Patent No.: US 11,363,292 B2
(45) Date of Patent: Jun. 14, 2022

(54) MEMORY ACCESS WINDOW AND PADDING FOR MOTION VECTOR REFINEMENT AND MOTION COMPENSATION

(71) Applicant: HUAWEI TECHNOLOGIES CO., LTD., Shenzhen (CN)

(72) Inventors: Semih Esenlik, Munich (DE); Ivan Krasnov, Munich (DE); Zhijie Zhao, Munich (DE); Jianle Chen, Santa Clara, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/999,031

(22) Filed: Aug. 20, 2020

(65) Prior Publication Data
US 2020/0404323 A1 Dec. 24, 2020

Related U.S. Application Data

(63) Continuation of application No. PCT/CN2019/093465, filed on Jun. 28, 2019.
(Continued)

(51) Int. Cl.
*H04N 11/02* (2006.01)
*H04N 19/563* (2014.01)
(Continued)

(52) U.S. Cl.
CPC ......... *H04N 19/563* (2014.11); *H04N 19/103* (2014.11); *H04N 19/172* (2014.11);
(Continued)

(58) Field of Classification Search
CPC .................................................. H04N 19/563
(Continued)

(56) References Cited

U.S. PATENT DOCUMENTS

| 2005/0058196 A1* | 3/2005 | Fernandes | H04N 19/40 375/240.2 |
|---|---|---|---|
| 2008/0019447 A1 | 1/2008 | Kondo | |

(Continued)

FOREIGN PATENT DOCUMENTS

| EP | 1988502 A1 | 11/2008 |
|---|---|---|
| GB | 2524476 A | 9/2015 |

(Continued)

OTHER PUBLICATIONS

Xu Chen et al, Decoder-Side Motion Vector Refinement Based on Bilateral Template Matching. Joint Video Exploration Team (JVET) of ITU-T SG 16 WP 3 and ISO/IEC JTC 1/SC 29/WG 11, 4th Meeting: Chengdu, CN, Oct. 15-21, 2016, JVET-D0029, 4 pages.

(Continued)

*Primary Examiner* — Leron Beck
(74) *Attorney, Agent, or Firm* — Leydig, Voit & Mayer, Ltd.

(57) ABSTRACT

The present disclosure relates to motion vector determination using template or bilateral matching and predictor generation based on the motion vector. The template or bilateral matching and/or the predictor generation use interpolation filtering. The interpolation filtering operation accesses integer sample positions within a window, and further uses padded sample values for integer sample positions outside the window, which are based on at least one sample within said window, and uses the accessed integer sample position values as well as the padded sample values to perform the template or bilateral matching and/or predictor generation.

23 Claims, 18 Drawing Sheets

Related U.S. Application Data

(60) Provisional application No. 62/691,594, filed on Jun. 28, 2018, provisional application No. 62/691,582, filed on Jun. 28, 2018.

(51) Int. Cl.

| | |
|---|---|
| *H04N 19/103* | (2014.01) |
| *H04N 19/176* | (2014.01) |
| *H04N 19/57* | (2014.01) |
| *H04N 19/80* | (2014.01) |
| *H04N 19/172* | (2014.01) |
| *H04N 19/513* | (2014.01) |
| *H04N 19/55* | (2014.01) |
| *H04N 19/56* | (2014.01) |
| *H04N 19/577* | (2014.01) |

(52) U.S. Cl.
CPC ......... *H04N 19/176* (2014.11); *H04N 19/521* (2014.11); *H04N 19/55* (2014.11); *H04N 19/56* (2014.11); *H04N 19/57* (2014.11); *H04N 19/577* (2014.11); *H04N 19/80* (2014.11)

(58) Field of Classification Search
USPC ........................................ 375/240.01–240.29
See application file for complete search history.

(56) References Cited

U.S. PATENT DOCUMENTS

| | | | |
|---|---|---|---|
| 2012/0189059 A1 | 7/2012 | Segall | |
| 2013/0044809 A1* | 2/2013 | Chong | H04N 19/182 375/240.03 |
| 2013/0315313 A1 | 11/2013 | Yang et al. | |
| 2014/0010306 A1 | 1/2014 | Francois et al. | |
| 2014/0254679 A1* | 9/2014 | Ramasubramonian | H04N 19/577 375/240.15 |
| 2014/0301467 A1 | 10/2014 | Thirumalai et al. | |
| 2016/0286232 A1* | 9/2016 | Li | H04N 19/119 |
| 2017/0006304 A1 | 1/2017 | Miyoshi | |
| 2017/0272775 A1 | 9/2017 | Wang et al. | |
| 2018/0241998 A1* | 8/2018 | Chen | H04N 19/51 |
| 2019/0020895 A1* | 1/2019 | Liu | H04N 19/176 |
| 2020/0404323 A1* | 12/2020 | Esenlik | H04N 19/103 |

FOREIGN PATENT DOCUMENTS

| | | |
|---|---|---|
| RU | 2335096 C1 | 9/2008 |
| WO | 2017036414 A1 | 3/2017 |
| WO | 2018022309 A1 | 2/2018 |
| WO | 2019072370 A1 | 4/2019 |
| WO | 2019072372 A1 | 4/2019 |

OTHER PUBLICATIONS

V. Sze et. al., 5.3 Fractional Sample Interpolation of High Efficiency Video Coding (HEVC) book, Springer, 2014. total 8 pages.

Jianle Chen et al. Algorithm Description of Joint Exploration Test Model 1, Joint Video Exploration Team (JVET) of ITU-T SG 16 WP 3 and ISO/IEC JTC 1/SC 29/WG 11, JVET-A1001, 1nd Meeting: Geneva, CH, Oct. 19-21, 2015. total 27 pages.

ITU-T H.265(Feb. 2018), Series H: Audiovisual and Multimedia Systems Infrastructure of audiovisual services Coding of moving video, High efficiency video coding, Feb. 2018. total 692 pages.

ITU-T H.264 Telecommunication Standardization Sector of ITU (Apr. 2017), Series H: Audiovisual and Multimedia Systems, Infrastructure of audiovisual services Coding of moving video, Advanced video coding for generic audiovisual services, Apr. 2017. total 812 pages.

Output document of JVET,"Algorithm Description of Joint Exploration Test Model 7 (JEM 7)", Joint Video Exploration Team (JVET) of ITU-T SG 16 WP 3 and ISO/IEC JTC 1/SC 29/W6 11 ,Document: JVET-G001-v1, 7th Meeting:Torino, IT, Jul. 13-21, 2017, total 48 pages.

Chen et al., "Description of SDR, HDR and 360° video coding technology proposal by Huawei, GoPro, HiSilicon, and Samsung," buJoint Video Exploration Team (JVET) of ITU-T SG 16 WP 3 and ISO/IEC JTC 1/SC 29/WG 11, 10th Meeting: San Diego, US, [JVET-J0025_v2], JVET-J0025 (version 4), ITU-T, Apr. 14, 2018, URL: http://phenix.it-sudparis.eu/jvet/doc_end_user/documents/10_San%20Diego/wg11/JVET-J0025-v4.zip>: JVET-J0025_v3.docx, total 7 pages (Apr. 10-20, 2018).

Esenlik et al., CE9: Report on the results of tests CE9.2.15 and CE9.2.16, Joint Video Experts Team (JVET) of ITU-T SG 16 WP 3 and ISO/IEC JTC 1/SC 29/WG 11 12th Meeting: Macao, CN, [JVET-L0163], JVET-L0163 (version 1), ITU-T, Sep. 24, 2018, URL:http://phenix.it-sudparis.eu/jvet/doc_end_user/documents/12_Macao/wg11/JVET-L0163-v1.zip>: JVET-L0163.DOCX, total 8 pages (Oct. 3-12, 2018).

\* cited by examiner

MEMORY ACCESS WINDOW AND PADDING FOR MOTION VECTOR REFINEMENT AND MOTION COMPENSATION

Embodiments of the present invention relate to motion vector determination and refinement as well as predictor determination for motion compensation which may be employed during encoding and decoding of videos.

BACKGROUND

Current hybrid video codecs employ predictive coding. A picture of a video sequence is subdivided into blocks of pixels and these blocks are then coded. Instead of coding a block pixel by pixel, the entire block is predicted using already encoded pixels in the spatial or temporal proximity of the block. The encoder further processes only the differences between the block and its prediction. The further processing typically includes a transformation of the block pixels into coefficients in a transformation domain. The coefficients may then be further compressed by means of quantization and further compacted by entropy coding to form a bitstream. The bitstream further includes any signaling information which enables the decoder to decode the encoded video. For instance, the signaling may include settings concerning the encoder settings such as size of the input picture, frame rate, quantization step indication, prediction applied to the blocks of the pictures, or the like.

Temporal prediction exploits temporal correlation between pictures, also referred to as frames, of a video. The temporal prediction is also called inter-prediction, as it is a prediction using the dependencies between (inter) different video frames. Accordingly, a block being encoded, also referred to as a current block, is predicted from one or more previously encoded picture(s) referred to as a reference picture(s). A reference picture is not necessarily a picture preceding the current picture in which the current block is located in the displaying order of the video sequence. The encoder may encode the pictures in a coding order different from the displaying order. As a prediction of the current block, a co-located block in a reference picture may be determined. The co-located block is a block which is located in the reference picture on the same position as is the current block in the current picture. Such prediction is accurate for motionless picture regions, i.e. picture regions without movement from one picture to another.

In order to obtain a predictor which takes into account the movement, i.e. a motion compensated predictor, motion estimation is typically employed when determining the prediction of the current block. Accordingly, the current block is predicted by a block in the reference picture, which is located in a distance given by a motion vector from the position of the co-located block. In order to enable a decoder to determine the same prediction of the current block, the motion vector may be signaled in the bitstream. In order to further reduce the signaling overhead caused by signaling the motion vector for each of the blocks, the motion vector itself may be estimated. The motion vector estimation may be performed based on the motion vectors of the neighboring blocks in spatial and/or temporal domain.

The prediction of the current block may be computed using one reference picture or by weighting predictions obtained from two or more reference pictures. The reference picture may be an adjacent picture, i.e. a picture immediately preceding and/or the picture immediately following the current picture in the display order since adjacent pictures are most likely to be similar to the current picture. However, in general, the reference picture may be also any other picture preceding or following the current picture in the displaying order and preceding the current picture in the bitstream (decoding order). This may provide advantages for instance in case of occlusions and/or non-linear movement in the video content. The reference picture identification may thus be also signaled in the bitstream.

A special mode of the inter-prediction is a so-called bi-prediction in which two reference pictures are used in generating the prediction of the current block. In particular, two predictions determined in the respective two reference pictures are combined into a prediction signal of the current block. The bi-prediction may result in a more accurate prediction of the current block than the uni-prediction, i.e. prediction only using a single reference picture. The more accurate prediction leads to smaller differences between the pixels of the current block and the prediction (referred to also as "residuals"), which may be encoded more efficiently, i.e. compressed to a shorter bitstream. In general, more than two reference pictures may be used to find respective more than two reference blocks to predict the current block, i.e. a multi-reference inter prediction can be applied. The term multi-reference prediction thus includes bi-prediction as well as predictions using more than two reference pictures.

In order to provide more accurate motion estimation, the resolution of the reference picture may be enhanced by interpolating samples between pixels. Fractional pixel interpolation can be performed by weighted averaging of the closest pixels. In case of half-pixel resolution, for instance a bilinear interpolation is typically used. Other fractional pixels are calculated as an average of the closest pixels weighted by the inverse of the distance between the respective closest pixels to the pixel being predicted.

The motion vector estimation is a computationally complex task in which a similarity is calculated between the current block and the corresponding prediction blocks (predictors) pointed to by candidate motion vectors in the reference picture. Typically, the search region includes M×M samples of the image and each of the sample position of the M×M candidate positions is tested. The test includes calculation of a similarity measure between the N×N reference block C and a block R, located at the tested candidate position of the search region. For its simplicity, the sum of absolute differences (SAD) is a measure frequently used for this purpose and given by:

$$SAD(x, y) = \sum_{i=0}^{N-1} \sum_{j=0}^{N-1} |R_{i,j}(x, y) - C_{i,j}|$$

In the above formula, x and y define the candidate position within the search region, while indices i and j denote samples within the reference block C and candidate block R. The candidate position is often referred to as block displacement or offset, which reflects the representation of the block matching as shifting of the reference block within the search region and calculating a similarity between the reference block C and the overlapped portion of the search region. In order to reduce the complexity, the number of candidate motion vectors is usually reduced by limiting the candidate motion vectors to a certain search space. The search space may be, for instance, defined by a number and/or positions of pixels surrounding the position in the reference picture corresponding to the position of the current block in the current image. After calculating SAD for all M×M candidate positions x and y, the best matching block R is the block on the position resulting in the lowest SAD, corresponding to the largest similarity with reference block C. On the other hand, the candidate motion vectors may be defined by a list of candidate motion vectors formed by motion vectors of neighboring blocks.

Motion vectors are usually at least partially determined at the encoder side and signaled to the decoder within the coded bitstream. However, the motion vectors may also be derived at the decoder. In such case, the current block is not available at the decoder and cannot be used for calculating the similarity to the blocks to which the candidate motion vectors point in the reference picture. Therefore, instead of the current block, a template is used which is constructed out of pixels of already decoded blocks ("template matching"). For instance, already decoded pixels adjacent to the current block may be used. Such motion estimation provides an advantage of reducing the signaling: the motion vector is derived in the same way at both the encoder and the decoder and thus, no signaling is needed. On the other hand, the accuracy of such motion estimation may be lower.

In case of bi-prediction, alternatively to using a template, also a comparison between candidate coding blocks in different reference pictures which candidate motion vectors point to can be used ("bilateral matching"), as will be further detailed below.

In order to provide a tradeoff between the accuracy and signaling overhead, the motion vector estimation may be divided into two steps: motion vector derivation and motion vector refinement. For instance, a motion vector derivation may include selection of a motion vector from the list of candidates. Such a selected motion vector may be further refined for instance by a search within a search space. The search in the search space is based on calculating cost function for each candidate motion vector, i.e. for each candidate position of block to which the candidate motion vector points.

Document JVET-D0029: Decoder-Side Motion Vector Refinement Based on Bilateral Template Matching, X. Chen, J. An, J. Zheng (the document can be found at: http://phenix.it-sudparis.eu/jvet/site) shows motion vector refinement in which a first motion vector in integer pixel resolution is found and further refined by a search with a half-pixel resolution in a search space around the first motion vector.

In order to perform motion vector refinement, it is necessary to store at least those samples in the memory, which are necessary for the current block to perform the refinement, i.e. the samples which correspond to the search space and samples which can be accessed when template matching or bilateral matching in the search space is performed.

External memory access is an important design parameter in present hardware architectures and/or software implementations. This is caused by the fact that the external memory access slows down the processing in comparison with the internal memory utilization. On the other hand, internal memory on chip is limited, for instance due to the chip size implementation.

SUMMARY

The present disclosure is based, for example, on the observation that motion vector refinement when implemented in combination with fractional interpolation may require further increase of on-chip memory size or even external memory access. Both options may be undesirable. The same holds when interpolation is applied in order to enhance the resolution of a predictor by including fractional sample positions.

In view of the above mentioned problem, the present disclosure provides motion vector prediction which enables to take into account the number of accesses to the external memory and the number of samples which are necessary to be accessible for motion vector refinement of a motion vector for a coding block and calculating a predictor for the block.

This is achieved by padding (replacing) the values which are located outside a predefined memory access window for the purpose of motion vector refinement and/or fractional interpolation with replacement values based on one or more samples from within the memory access window.

This is achieved by the features of the independent claims.

According to an aspect of the present invention, an encoding apparatus for determining a predictor for encoding a block of a video image is provided. The encoding apparatus comprises processing circuitry configured to obtain an initial motion vector for the block, obtain a refined motion vector for the block based on the initial motion vector, and determine a predictor for the block according to the refined motion vector. The processing circuitry is configured to determine the predictor according to the refined motion vector using interpolation with an interpolation filter and to use at least one sample value of an integer sample position located inside a window and a padded sample value for an integer sample position located outside the window for the interpolation filtering, wherein the padded sample value is based on at least one sample value of a sample located inside the window.

According to another aspect of the present invention, a decoding apparatus for determining a predictor for decoding a block of a video image is provided. The decoding apparatus comprises processing circuitry configured to obtain an initial motion vector for the block, obtain a refined motion vector for the prediction block based on the initial motion vector, and determine a predictor for the block according to the refined motion vector. The processing circuitry is configured to determine the predictor according to the refined motion vector using interpolation with an interpolation filter and to use at least one sample value of an integer sample position located inside a window and a padded sample value for an integer sample position located outside the window for the interpolation filtering, wherein the padded sample value is based on at least one sample value of a sample located inside the window.

According to a further aspect of the present invention, an encoding method for determining a predictor for encoding a block of a video image is provided. The encoding method comprises the steps of obtaining an initial motion vector for the block, obtaining a refined motion vector for the block based on the initial motion vector, and determining a predictor for the block according to the refined motion vector, wherein the determining step determines the predictor according to the refined motion vector using interpolation with an interpolation filter, and uses at least one sample value of an integer sample position located inside a window and a padded sample value for an integer sample position located outside the window for the interpolation filtering, wherein the padded sample value is based on at least one sample value of an integer sample located inside the window.

According to still a further aspect of the present invention, a decoding method for determining a predictor for decoding a block of a video image is provided. The decoding method comprises the steps of obtaining an initial motion vector for the block, obtaining a refined motion vector for the prediction block based on the initial motion vector, and determining the predictor according to the refined motion vector using interpolation with an interpolation filter, using at least one sample value of an integer sample position located inside a window and a padded sample value for an integer sample position located outside the window for the interpolation filtering, wherein the padded sample value is based on at least one sample value of an integer sample located inside the window.

Such methods and apparatuses provide an advantage of limiting the number of samples which are to be available for the purpose of predictor determination by interpolation filtering while also avoiding additional accesses to the storage/(external) memory storing the entire reference pictures.

In embodiments of the above aspects, the window is a window for interpolation filtering.

In accordance with embodiments, the interpolation may include accessing sample values at integer sample positions within a window and/or padding at least one sample value for an integer sample position located outside of the window by a padding value) which is based on at least one sample within the window and/or using the accessed integer position sample values as well as the padded sample values to perform interpolation filtering.

For instance, the processing circuitry may be configured to determine a refinement of the initial motion vector based on a search space of candidate motion vectors and to determine the refined motion vector based on the initial motion vector and the refinement.

Also, for instance, the processing circuitry may be configured to determine the search space based on the initial motion vector. More specifically, the search space may be located on a position defied by the initial motion vector. For instance, the search space may be centered around the initial motion vector. More specifically, according to an example, the search space may comprise the nine integer sample motion vector candidates, i.e. the initial notion vector and the eight motion vector candidates located around.

In embodiments, the processing circuitry is further configured to reconstruct the block based on the predictor. The reconstruction may be performed in a decoding apparatus as well as in a decoding loop of an encoding apparatus. Aspects of the disclosure relating to a method may include a respective reconstruction step of the block based on the predictor.

For instance, the processing circuitry may be configured to obtain a difference between the block and the predictor, also called a "residual". More specifically, the processing circuitry may be configured to reconstruct the block based on the predictor and the residual, still more specifically as a sum of the predictor and the residual.

For instance, the padded sample value (replacement value) is determined by mirroring with respect to the axis of the interpolation filter the value of the corresponding used (assessed) integer sample position. The interpolation filtering may be a one-dimensional or separable two-dimensional filtering.

In one exemplary implementation, the window is formed by all integer sample positions accessible for obtaining the predictor in a position specified by the initial motion vector.

The window is defined, for instance, by its vertical and/or horizontal size with respect to a block with a size of the block located on the initial motion vector position, or the initial motion vector position, or the vertical and horizontal length of the interpolation filter that is used for determining the predictor. The definition of a block being "located on" a particular position is, in embodiments, for example, meant to refer to the top-left sample position of the block. Alternatively, another sample position may be referred to, or the block position may be defined by being centered around the particular position. The processing circuitry can be configured to define or determine the position and/or size of the window according to the initial motion vector position, the size of the block and/or the vertical and horizontal length of the interpolation filter used for determining the predictor.

As another example, the padded sample value for the integer position outside the window is determined to be equal to the sample value of the at least one used integer sample position located inside the window, which is closest to the integer sample position located outside the window. In a particular example, in case of a one dimensional interpolation filter, padded sample values for plural integer sample positions located outside the window are used to determine the predictor using interpolation with an interpolation filter and the padded sample values for all the integer sample positions outside the window are determined to be equal to the sample value of the at least one used integer sample position located inside the window, which is closest to the integer sample positions located outside the window.

In accordance with embodiments, the number of sampled values to be padded depends on the difference between the initial motion vector and the refined motion vector.

In accordance with embodiments, the processing circuitry is configured to determine the refinement of the initial motion vector by template matching with a template or bilateral matching. The template or bilateral matching accesses sample values at integer sample positions within a further window. The further window includes the search space and further integer sample positions accessible for the template or bilateral matching, the template or bilateral matching further pads at least one sample value at an integer sample position located out of the further window by a padded sample (replacement) value which is based on at least one sample within the further window and uses the accessed integer sample position values as well as the padded sample values to perform the template or bilateral matching.

In one embodiment, said search space includes at least one fractional sample position with a value obtained by interpolation filtering with a filter of a predefined tap-size; and the interpolation filtering uses said accessed integer sample position values and the at least one replacement (padded sample) value to obtain said at least one fractional sample position value.

More specifically, the padded sample value used in the template or bilateral matching is determined by mirroring with respect to the axis of the filter the value of the corresponding assessed integer sample position.

Alternatively, the padded sample value used in the template or bilateral matching is determined to be equal to the value on a closest of the accessed integer sample positions.

In accordance with embodiments, the further window is defined by its vertical and/or horizontal size with respect to at least one of the search space, a block with a size of the block located on the initial motion vector position, and the initial motion vector position.

Preferably, the further window is the same as the window.

In accordance with embodiments, the refinement is determined by bilateral matching and the processing circuitry is configured to obtain at least two initial motion vectors pointing to positions in different reference pictures and forming a pair of initial motion vectors.

In accordance with other embodiments, the refinement is determined by template matching and the processing circuitry is further configured to obtain a template for the block and determine the refinement of the initial motion vector by template matching with the template in the search space.

In one embodiment, said search space includes at least one fractional sample position with a value obtained by interpolation filtering with a filter of a predefined tap-size; and the interpolation filtering uses said used integer sample position values and the at least one padded sample value to obtain said at least one fractional sample position value.

According to an aspect of the invention a non-transitory computer-readable storage medium is provided storing instructions which when executed by a processor/processing circuitry perform the steps according to any of the above aspects or embodiments or their combinations.

According to a further particular aspect of the invention, an encoding apparatus is provided for encoding video images split to prediction blocks into a bitstream or respectively for encoding a prediction block of a video image into a bitstream. The encoding apparatus comprises processing circuitry for determination of a motion vector for a prediction block. The processing circuitry is configured to obtain at least one initial motion vector and determine a refinement of the initial motion vector on the basis of a search space of candidate motion vectors, so as to obtain a refined motion vector. The search space is located on a position given by the initial motion vector. The encoding apparatus further comprises encoding circuitry (which may be comprised in the processing circuitry) for encoding a difference between the prediction block and a predictor given by a prediction block in a position based on the determined motion vector and for generating a bitstream including the encoded difference and the initial motion vector. The encoding apparatus further comprises a motion prediction unit (which may be comprised in the processing circuitry) for determining the predictor according to the motion vector using interpolation filtering with an interpolation filter. The interpolation filtering accesses sample values at integer sample positions within a predetermined window, replaces at least one sample value at an integer sample position located out of the window by a replacement value which is based on at least one sample within the window and uses the accessed integer position sample values as well as the replacement values to perform the interpolation filtering.

According to still another particular aspect of the invention, a decoding apparatus is provided for decoding from a bitstream video images split to prediction blocks. The decoding apparatus comprises a parsing unit (which may be comprised in a processing circuitry of the decoding apparatus) for parsing from the bitstream an initial motion vector and an encoded difference between a prediction block and a predictor given by a prediction block in a position specified by a refined motion vector. The decoding apparatus comprises a processing circuitry (e.g. the processing circuitry of the decoding apparatus) for determination of a motion vector for a prediction block. The processing circuitry is configured to obtain at least one initial motion vector and determine a refinement of the initial motion vector on the basis of a search space of candidate motion vectors, so as to obtain a refined motion vector. The search space is located on a position given by the initial motion vector. Still further, the decoding apparatus comprises decoding circuitry (which may be comprised in the processing circuitry of the decoding apparatus) for reconstructing the prediction block as a sum of the parsed difference and the predictor given by the prediction block in the position specified by the refined motion vector determined by the processing circuitry for determining a motion vector. The decoding circuitry is further configured to determine the predictor according to the motion vector using interpolation filtering with an interpolation filter. The interpolation filtering accesses sample values at integer sample positions within a predetermined window, replaces at least one sample value at an integer sample position located out of the window by a replacement value which is based on at least one sample within the window and uses the accessed integer position sample values as well as the replacement values to perform the interpolation filtering.

According to yet a further aspect of the invention, an encoding method is provided for encoding video images split to prediction blocks into a bitstream. The encoding method comprises determining a motion vector for a prediction block. The determining a motion vector includes the steps of obtaining at least one initial motion vector and determining a refinement of the initial motion vector on the basis of a search space of candidate motion vectors, so as to obtain a refined motion vector. The search space is located on a position given by the initial motion vector. The encoding method further comprises encoding a difference between the prediction block and a predictor given by a prediction block in a position based on the determined motion vector and for generating a bitstream including the encoded difference and the initial motion vector. The method further comprises determining the predictor according to the motion vector using interpolation filtering with an interpolation filter. The interpolation filtering accesses sample values at integer sample positions within a predetermined window, replaces at least one sample value at an integer sample position located out of the window by a replacement value which is based on at least one sample within the window and uses the accessed integer position sample values as well as the replacement values to perform the interpolation filtering.

According to still an additional aspect of the invention, a decoding method for decoding from a bitstream video images split to prediction blocks is provided. The decoding comprises the steps of parsing from the bitstream an initial motion vector and an encoded difference between a prediction block and a predictor given by a prediction block in a position specified by a refined motion vector. The method further comprises determining a motion vector for a prediction block. The determining a motion vector includes the steps of obtaining at least one initial motion vector and determining a refinement of the initial motion vector on the basis of a search space of candidate motion vectors, so as to obtain a refined motion vector. The search space is located on a position given by the initial motion vector. The decoding method further comprises reconstructing the prediction block as a sum of the parsed difference and the predictor given by the prediction block in the position specified by the refined motion vector determined by the step of determining a motion vector. Moreover, the method comprises determining the predictor according to the motion vector using interpolation filtering with an interpolation filter. The interpolation filtering accesses sample values at integer sample positions within a predetermined window, replaces at least one sample value at an integer sample position located out of the window by a replacement value which is based on at least one sample within the window and uses the accessed integer position sample values as well as the replacement values to perform the interpolation filtering.

Further advantages and embodiments of the present invention are set forth in dependent claims.

In the following exemplary embodiments are described in more detail with reference to the attached figures and drawings, in which.

Figure 19:
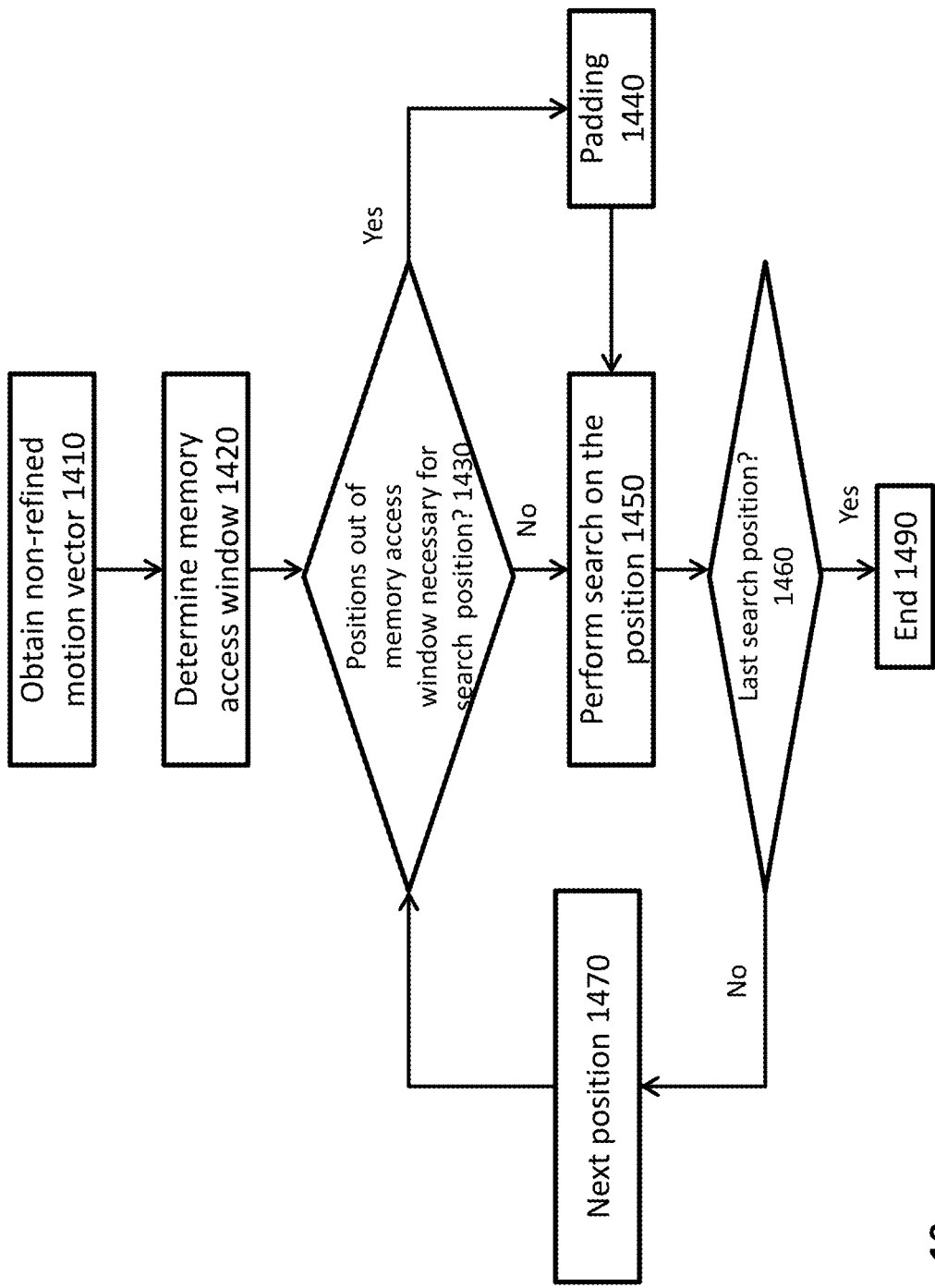
Figure 20:
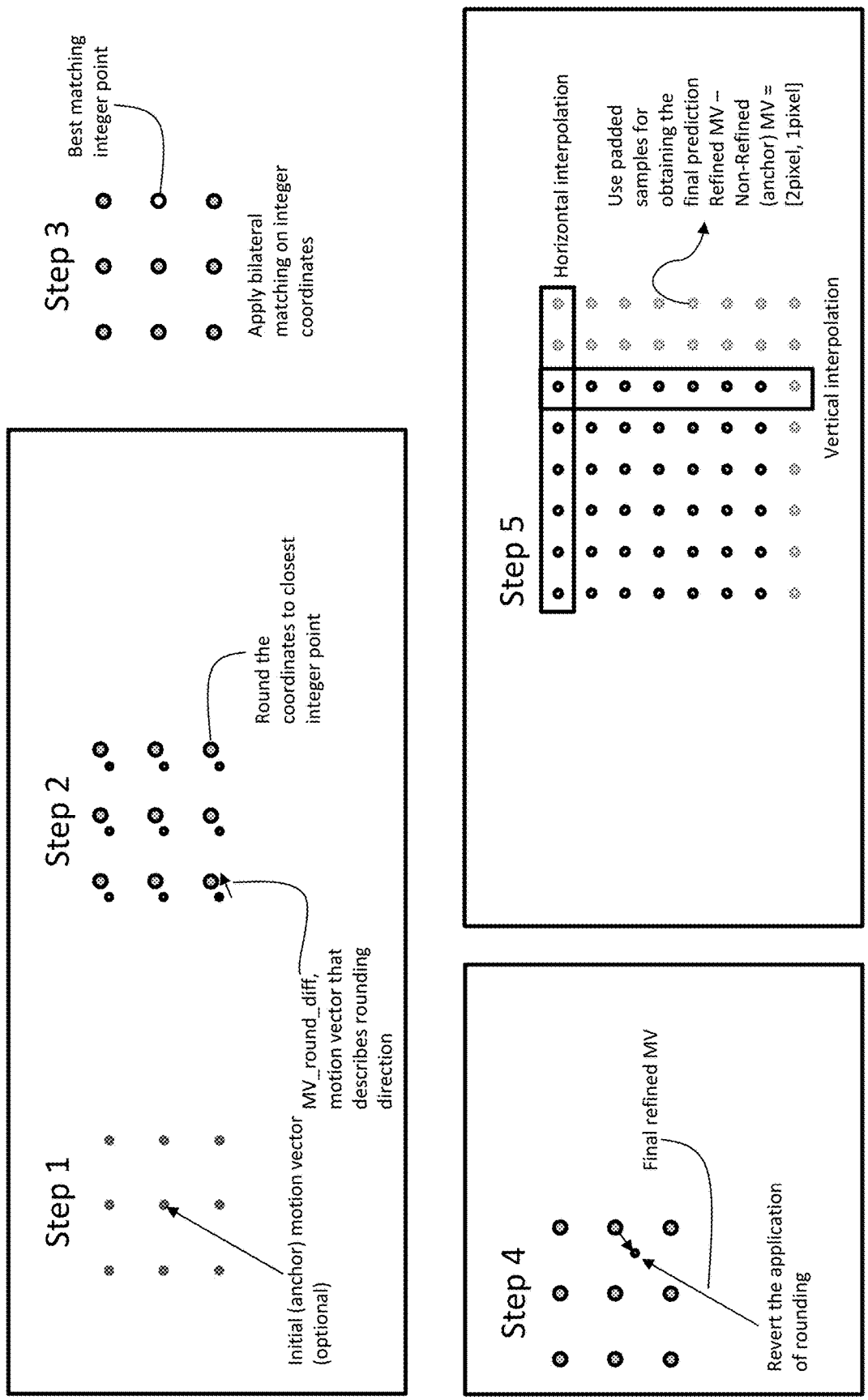
Figure 21:
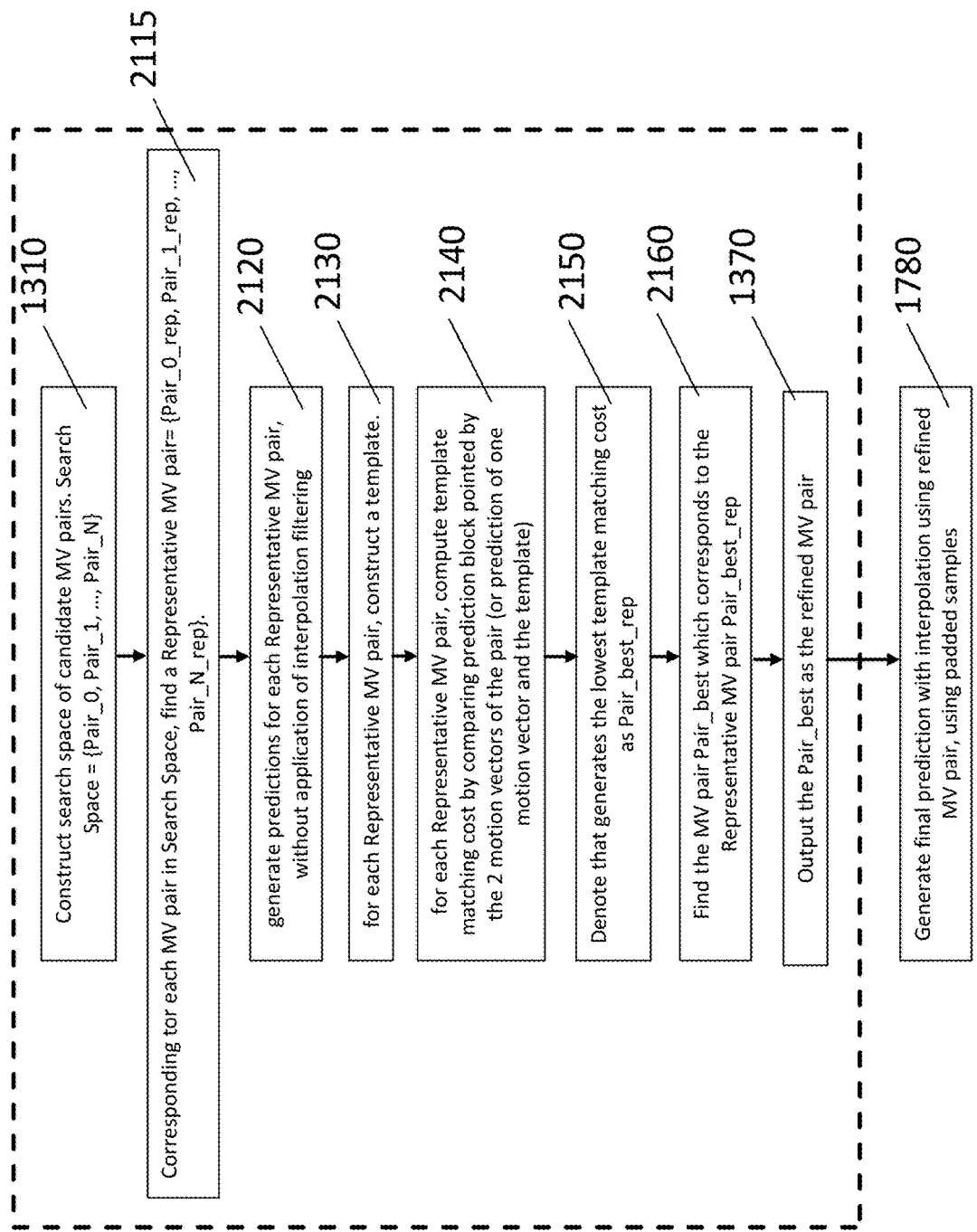

FIG. 19 describes a method according to an embodiment;

FIG. 20 is an illustration of a scheme for performing motion vector refinement based on a search space and obtaining prediction by interpolation in accordance with further exemplary embodiments of the present invention; and FIG. 21 is a flow diagram illustrating the motion vector refinement and obtaining prediction according to the exemplary embodiments of FIG. 20.

DETAILED DESCRIPTION

The present disclosure relates to adjustment of the number of samples which are to be accessible to perform motion vector refinement and interpolation in order to obtain fractional positions in a reference picture as well as in a predictor.

As mentioned above, the external memory access is one of the most important design considerations in today's hardware and software architectures. Motion vector estimation, especially when including template matching or bilateral matching, for instance in case of motion vector refinement, may also be used with interpolation filtering to obtain fractional positions of the search space. Use of the interpolation filtering may require increase of the number of samples which need to be accessed from the memory. However, this may lead to either increase of the expensive on-chip memory or to increased number of external memory accesses, which on the other hand slows down the implementation. Especially at the decoder side, these problems may lead to more expensive or slower applications which is not desirable.

In order to prevent such situation, the present disclosure provides a restriction on external memory accesses to predetermined windows.

The windows may have a predefined size. For instance, in motion vector refinement, a window may include at least all search space positions. The samples which are accessed are samples which are actually used for the particular block and its search space to perform the template or bilateral matching, for instance, all samples which are used to calculate a cost function with the template or a bilateral cost function. The accessible samples include in addition samples which are not necessarily accessed during a particular template or bilateral matching for a particular block for instance because the search space was iteratively determined to include different samples and the template or bilateral matching on that samples does not require all the accessible pixels. The accessible samples include also samples which could have resulted from any iteratively determined search space (i.e. assuming any block content) and possibly also samples which would be accessed for performing template matching in such possible search spaces.

In case of generating the final prediction with interpolation filtering the amount of extension of the required memory access window in the conventional approach depends on the maximum difference between the determined refined motion vector and the initial motion vector.

It is noted that the window may be defined smaller than all accessible samples. Such window definition enables to maintain a lower number of samples to be stored in the on-chip memory and fetched from the external memory. The present disclosure thus limits the number of integer samples to be stored/cached/buffered for the purpose of operations in connection with template or bilateral matching for a particular block. This does not mean that other samples are generally not existing/available in another memory or storage. As discussed above, typically the entire reference pictures may be stored in an external memory. However, for the purpose of template or bilateral matching, only a portion of them, namely the samples within the window may be loaded and used for the template matching.

Provision of such limited window enables implementations which exploit it and in fact only load the window samples. In order to ensure similar operation of encoder and decoder, the window definition may be predefined in standard or signaled in the bitstream. Especially if refined motion vectors are used to form reference pictures, both encoder and decoder should use the same approach.

Figure 1:
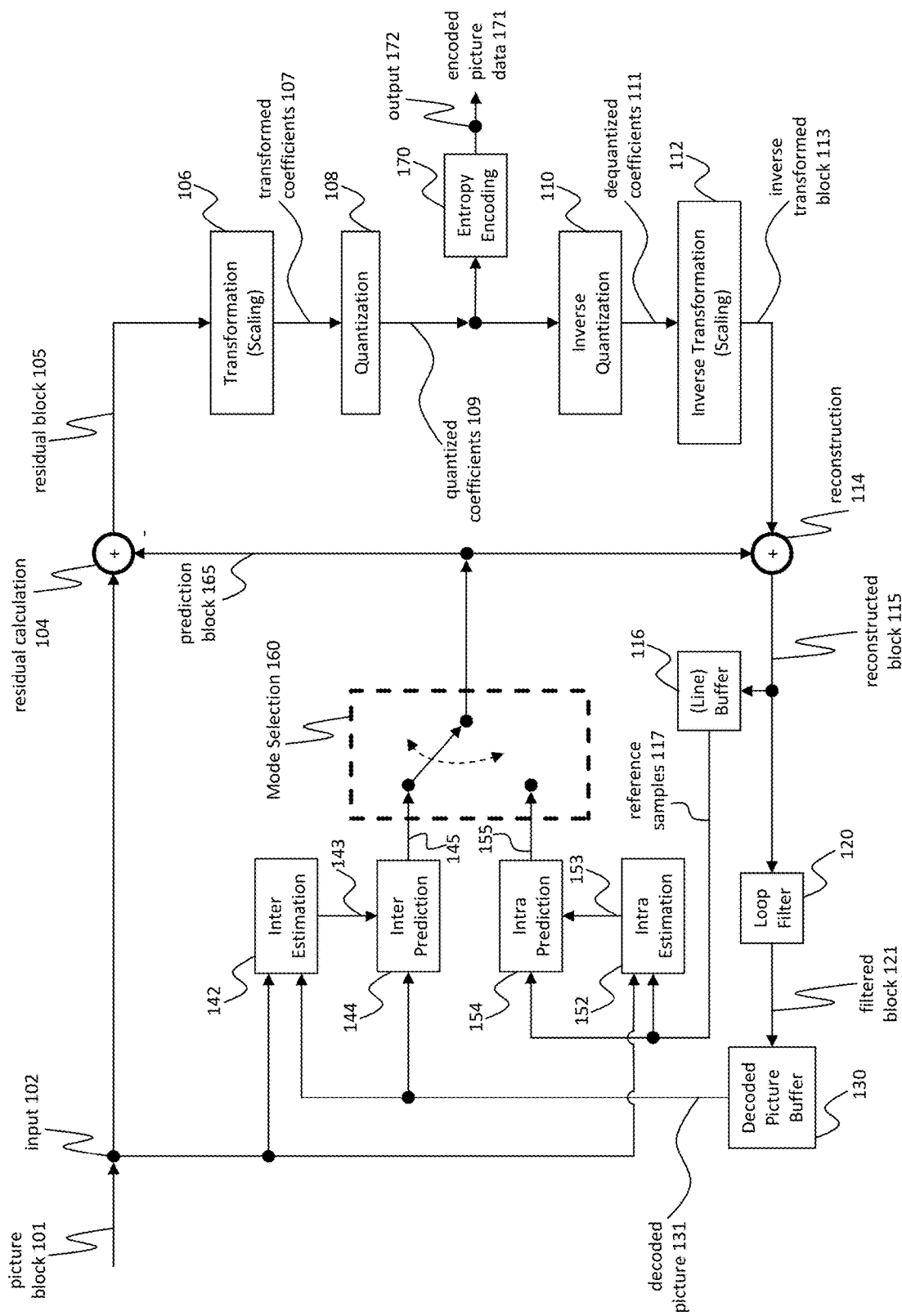
FIG. 1 is a block diagram showing an exemplary structure of an encoder in which the motion vector derivation and refinement may be employed.

FIG. 1 shows an encoder 100 which comprises an input for receiving input image samples of frames or pictures of a video stream and an output for generating an encoded video bitstream. The term "frame" in this disclosure is used as a synonym for picture. However, it is noted that the present disclosure is also applicable to fields in case interlacing is applied. In general, a picture includes m times n pixels. This corresponds to image samples and may comprise one or more color components. For the sake of simplicity, the following description refers to pixels meaning samples of luminance. However, it is noted that the motion vector search of the invention can be applied to any color component including chrominance or components of a search space such as RGB or the like. On the other hand, it may be beneficial to only perform motion vector estimation for one component and to apply the determined motion vector to more (or all) components.

The input blocks to be coded do not necessarily have the same size. One picture may include blocks of different sizes and the block raster of different pictures may also differ.

In an explicative realization, the encoder 100 is configured to apply prediction, transformation, quantization, and entropy coding to the video stream. The transformation, quantization, and entropy coding are carried out respectively by a transform unit 106, a quantization unit 108 and an entropy encoding unit 170 so as to generate as an output the encoded video bitstream.

The video stream may include a plurality of frames, wherein each frame is divided into blocks of a certain size that are either intra or inter coded. The blocks of for example the first frame of the video stream are intra coded by means of an intra prediction unit 154. An intra frame is coded using only the information within the same frame, so that it can be independently decoded and it can provide an entry point in the bitstream for random access. Blocks of other frames of the video stream may be inter coded by means of an inter prediction unit 144: information from previously coded frames (reference frames) is used to reduce the temporal redundancy, so that each block of an inter-coded frame is predicted from a block in a reference frame. A mode selection unit 160 is configured to select whether a block of a frame is to be processed by the intra prediction unit 154 or the inter prediction unit 144. This mode selection unit 160 also controls the parameters of intra or inter prediction. In order to enable refreshing of the image information, intra-coded blocks may be provided within inter-coded frames. Moreover, intra-frames which contain only intra-coded blocks may be regularly inserted into the video sequence in order to provide entry points for decoding, i.e. points where the decoder can start decoding without having information from the previously coded frames.

The intra estimation unit 152 and the intra prediction unit 154 are units which perform the intra prediction. In particular, the intra estimation unit 152 may derive the prediction mode based also on the knowledge of the original image while intra prediction unit 154 provides the corresponding predictor, i.e. samples predicted using the selected prediction mode, for the difference coding. For performing spatial or temporal prediction, the coded blocks may be further processed by an inverse quantization unit 110, and an inverse transform unit 112. After reconstruction of the block a loop filtering unit 120 is applied to further improve the quality of the decoded image. The filtered blocks then form the reference frames that are then stored in a decoded picture buffer 130. Such decoding loop (decoder) at the encoder side provides the advantage of producing reference frames which are the same as the reference pictures reconstructed at the decoder side. Accordingly, the encoder and decoder side operate in a corresponding manner. The term "reconstruction" here refers to obtaining the reconstructed block by adding to the decoded residual block the prediction block.

The inter estimation unit 142 receives as an input a block of a current frame or picture to be inter coded and one or several reference frames from the decoded picture buffer 130. Motion estimation is performed by the inter estimation unit 142 whereas motion compensation is applied by the inter prediction unit 144. The motion estimation is used to obtain a motion vector and a reference frame based on certain cost function, for instance using also the original image to be coded. For example, the motion estimation unit 142 may provide initial motion vector estimation. The initial motion vector may then be signaled within the bitstream in form of the vector directly or as an index referring to a motion vector candidate within a list of candidates constructed based on a predetermined rule in the same way at the encoder and the decoder. The motion compensation then derives a predictor of the current block as a translation of a block co-located with the current block in the reference frame to the reference block in the reference frame, i.e. by a motion vector. The inter prediction unit 144 outputs the prediction block for the current block, wherein said prediction block minimizes the cost function. For instance, the cost function may be a difference between the current block to be coded and its prediction block, i.e. the cost function minimizes the residual block. The minimization of the residual block is based e.g. on calculating a sum of absolute differences (SAD) between all pixels (samples) of the current block and the candidate block in the candidate reference picture. However, in general, any other similarity metric may be employed, such as mean square error (MSE) or structural similarity metric (SSIM).

However, cost-function may also be the number of bits necessary to code such inter-block and/or distortion resulting from such coding. Thus, the rate-distortion optimization procedure may be used to decide on the motion vector selection and/or in general on the encoding parameters such as whether to use inter or intra prediction for a block and with which settings.

The intra estimation unit 152 and intra prediction unit 154 receive as an input a block of a current frame or picture to be intra coded and one or several reference samples from an already reconstructed area of the current frame. The intra prediction then describes pixels of a current block of the current frame in terms of a function of reference samples of the current frame. The intra prediction unit 154 outputs a prediction block for the current block, wherein said prediction block advantageously minimizes the difference between the current block to be coded and its prediction block, i.e., it minimizes the residual block. The minimization of the residual block can be based e.g. on a rate-distortion optimization procedure. In particular, the prediction block is obtained as a directional interpolation of the reference samples. The direction may be determined by the rate-distortion optimization and/or by calculating a similarity measure as mentioned above in connection with inter-prediction.

The inter estimation unit 142 receives as an input a block or a more universal-formed image sample of a current frame or picture to be inter coded and two or more already decoded pictures 231. The inter prediction then describes a current image sample of the current frame in terms of motion vectors to reference image samples of the reference pictures. The inter prediction unit 142 outputs one or more motion vectors for the current image sample, wherein said reference image samples pointed to by the motion vectors advantageously minimize the difference between the current image sample to be coded and its reference image samples, i.e., it minimizes the residual image sample. The predictor for the current block is then provided by the inter prediction unit 144 for the difference coding.

The difference between the current block and its prediction, i.e. the residual block 105, is then transformed by the transform unit 106. The transform coefficients 107 are quantized by the quantization unit 108 and entropy coded by the entropy encoding unit 170. The thus generated encoded picture data 171, i.e. encoded video bitstream, comprises intra coded blocks and inter coded blocks and the corresponding signaling (such as the mode indication, indication of the motion vector, and/or intra-prediction direction). The transform unit 106 may apply a linear transformation such as a Fourier or Discrete Cosine Transformation (DFT/FFT or DCT). Such transformation into the spatial frequency domain provides the advantage that the resulting coefficients 107 have typically higher values in the lower frequencies. Thus, after an effective coefficient scanning (such as zig-zag), and quantization, the resulting sequence of values has typically some larger values at the beginning and ends with a run of zeros. This enables further efficient coding. Quantization unit 108 performs the actual lossy compression by reducing the resolution of the coefficient values. The entropy coding unit 170 then assigns to coefficient values binary codewords to produce a bitstream. The entropy coding unit 170 also codes the signaling information (not shown in FIG. 1).

Figure 2:
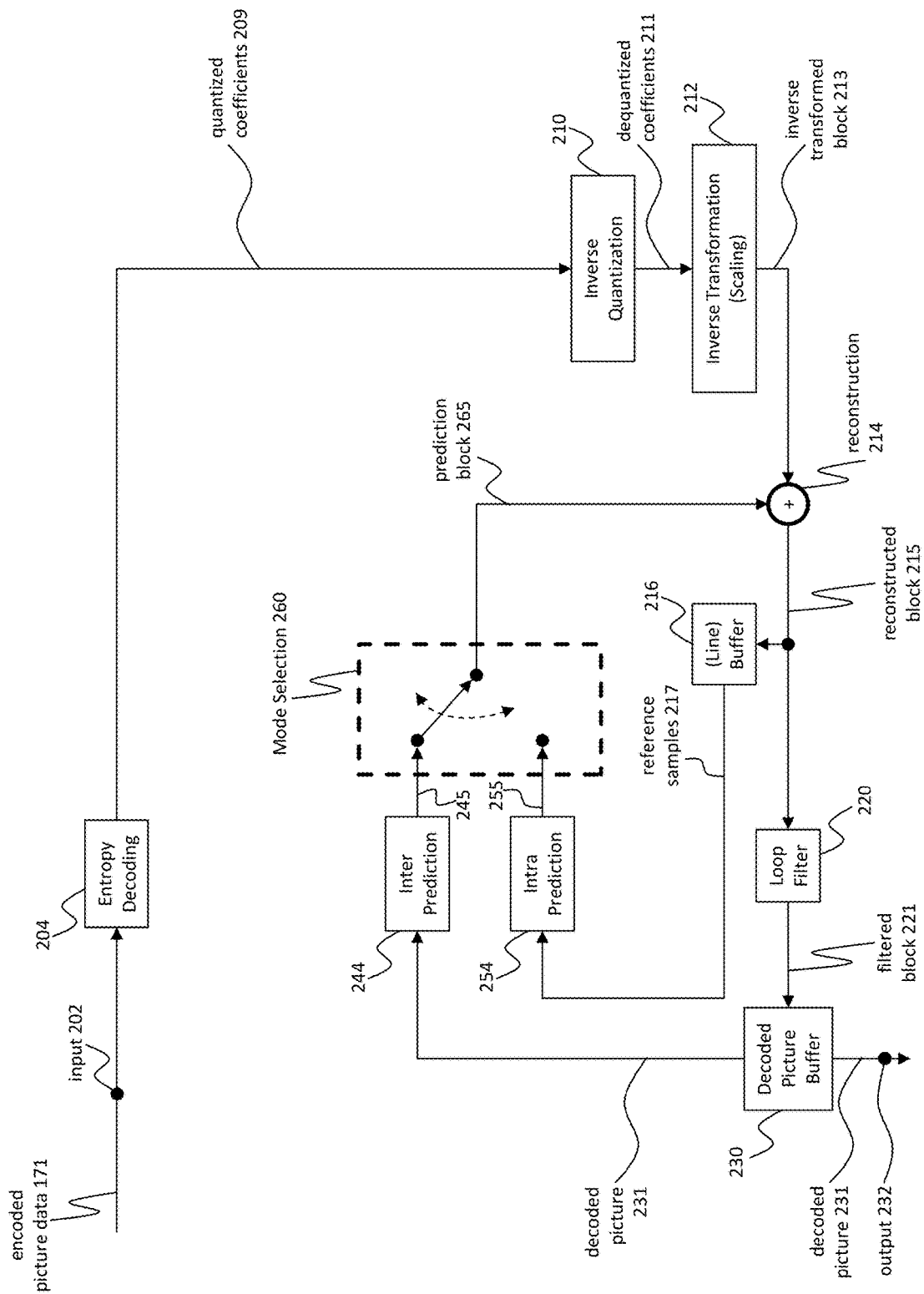
FIG. 2 is a block diagram showing an exemplary structure of a decoder in which the motion vector derivation and refinement may be employed.

FIG. 2 shows a video decoder 200. The video decoder 200 comprises particularly a decoded picture buffer 230, an inter prediction unit 244 and an intra prediction unit 254, which is a block prediction unit. The decoded picture buffer 230 is configured to store at least one (for uni-prediction) or at least two (for bi-prediction) reference frames reconstructed from the encoded video bitstream, said reference frames being different from a current frame (currently decoded frame) of the encoded video bitstream. The intra prediction unit 254 is configured to generate a prediction block, which is an estimate of the block to be decoded. The intra prediction unit 254 is configured to generate this prediction based on reference samples that are obtained from the decoded picture buffer 230.

The decoder 200 is configured to decode the encoded video bitstream generated by the video encoder 100, and preferably both the decoder 200 and the encoder 100 generate identical predictions for the respective block to be encoded/decoded. The features of the decoded picture buffer 230, reconstructed block 215, buffer 216 and the intra prediction unit 254 are similar to the features of the decoded picture buffer 130, reconstructed block 115, buffer 116 and the intra prediction unit 154 of FIG. 1.

The video decoder 200 comprises further units that are also present in the video encoder 100 like e.g. an inverse quantization unit 210, an inverse transform unit 212, and a loop filtering unit 220, which respectively correspond to the inverse quantization unit 110, the inverse transform unit 112, and the loop filtering unit 120 of the video coder 100.

An entropy decoding unit 204 is configured to decode the received encoded video bitstream and to correspondingly obtain quantized residual transform coefficients 209 and signaling information. The quantized residual transform coefficients 209 are fed to the inverse quantization unit 210 and an inverse transform unit 212 to generate a residual block. The residual block is added to a prediction block 265 and the addition is fed to the loop filtering unit 220 to obtain the decoded video. Frames of the decoded video can be stored in the decoded picture buffer 230 and serve as a decoded picture 231 for inter prediction.

Generally, the intra prediction units 154 and 254 of FIGS. 1 and 2 can use reference samples from an already encoded area to generate prediction signals for blocks that need to be encoded or need to be decoded.

The entropy decoding unit 204 receives as its input the encoded bitstream 171. In general, the bitstream is at first parsed, i.e. the signaling parameters and the residuals are extracted from the bitstream. Typically, the syntax and semantic of the bitstream is defined by a standard so that the encoders and decoders may work in an interoperable manner. As described in the above Background section, the encoded bitstream does not only include the prediction residuals. In case of motion compensated prediction, a motion vector indication is also coded in the bitstream and parsed therefrom at the decoder. The motion vector indication may be given by means of a reference picture in which the motion vector is provided and by means of the motion vector coordinates. So far, coding the complete motion vectors was considered. However, also only the difference between the current motion vector and the previous motion vector in the bitstream may be encoded. This approach allows exploiting the redundancy between motion vectors of neighboring blocks.

In order to efficiently code the reference picture, H.265 codec (ITU-T, H265, Series H: Audiovisual and multimedia systems: High Efficient Video Coding) provides a list of reference pictures assigning to list indices respective reference frames. The reference frame is then signaled in the bitstream by including therein the corresponding assigned list index. Such list may be defined in the standard or signaled at the beginning of the video or a set of a number of frames. It is noted that in H.265 there are two lists of reference pictures defined, called L0 and L1. The reference picture is then signaled in the bitstream by indicating the list (L0 or L1) and indicating an index in that list associated with the desired reference picture. Providing two or more lists may have advantages for better compression. For instance, L0 may be used for both uni-directionally inter-predicted slices and bi-directionally inter-predicted slices while L1 may only be used for bi-directionally inter-predicted slices. However, in general the present disclosure is not limited to any content of the L0 and L1 lists.

The lists L0 and L1 may be defined in the standard and fixed. However, more flexibility in coding/decoding may be achieved by signaling them at the beginning of the video sequence. Accordingly, the encoder may configure the lists L0 and L1 with particular reference pictures ordered according to the index. The L0 and L1 lists may have the same fixed size. There may be more than two lists in general. The motion vector may be signaled directly by the coordinates in the reference picture. Alternatively, as also specified in H.265, a list of candidate motion vectors may be constructed and an index associated in the list with the particular motion vector can be transmitted.

Motion vectors of the current block are usually correlated with the motion vectors of neighboring blocks in the current picture or in the earlier coded pictures. This is because neighboring blocks are likely to correspond to the same moving object with similar motion and the motion of the object is not likely to change abruptly over time. Consequently, using the motion vectors in neighboring blocks as predictors reduces the size of the signaled motion vector difference. The Motion Vector Predictors (MVPs) are usually derived from already encoded/decoded motion vectors from spatially neighboring or from temporally neighboring or co-located blocks in the reference picture. In H.264/AVC, this is done by doing a component wise median of three spatially neighboring motion vectors. Using this approach, no signaling of the predictor is required. Temporal MVPs from a co-located block in the reference picture are only considered in the so called temporal direct mode of H.264/AVC. The H.264/AVC direct modes are also used to derive other motion data than the motion vectors. Hence, they relate more to the block merging concept in HEVC. In HEVC, the approach of implicitly deriving the MVP was replaced by a technique known as motion vector competition, which explicitly signals which MVP from a list of MVPs, is used for motion vector derivation. The variable coding quad-tree block structure in HEVC can result in one block having several neighboring blocks with motion vectors as potential MVP candidates. Taking the left neighbor as an example, in the worst case a 64×64 luma prediction block could have 16 4×4 luma prediction blocks to the left when a 64×64 luma coding tree block is not further split and the left one is split to the maximum depth.

Advanced Motion Vector Prediction (AMVP) was introduced to modify motion vector competition to account for such a flexible block structure. During the development of HEVC, the initial AMVP design was significantly simplified to provide a good trade-off between coding efficiency and an implementation friendly design. The initial design of AMVP included five MVPs from three different classes of predictors: three motion vectors from spatial neighbors, the median of the three spatial predictors and a scaled motion vector from a co-located, temporally neighboring block. Furthermore, the list of predictors was modified by reordering to place the most probable motion predictor in the first position and by removing redundant candidates to assure minimal signaling overhead. The final design of the AMVP candidate list construction includes the following two MVP candidates: a) up to two spatial candidate MVPs that are derived from five spatial neighboring blocks; b) one temporal candidate MVPs derived from two temporal, co-located blocks when both spatial candidate MVPs are not available or they are identical; and c) zero motion vectors when the spatial, the temporal or both candidates are not available. Details on motion vector determination can be found in the book by V. Sze et al (Ed.), High Efficiency Video Coding (HEVC): Algorithms and Architectures, Springer, 2014, in particular in Chapter 5, incorporated herein by reference.

In order to further improve motion vector estimation without further increase in signaling overhead, it may be beneficial to further refine the motion vectors derived at the encoder side and provided in the bitstream. The motion vector refinement may be performed at the decoder without assistance from the encoder. The encoder in its decoder loop may employ the same refinement to obtain corresponding motion vectors. Motion vector refinement is performed in a search space which includes integer pixel positions and fractional pixel positions of a reference picture. For example, the fractional pixel positions may be half-pixel positions or quarter-pixel or further fractional positions. The fractional pixel positions may be obtained from the integer (full-pixel) positions by interpolation such as bi-linear interpolation. However, the present disclosure is equally applicable to search spaces not including fractional pixel positions.

In a bi-prediction of current block, two prediction blocks obtained using the respective first motion vector of list L0 and the second motion vector of list L1, are combined to a single prediction signal, which can provide a better adaptation to the original signal than uni-prediction, resulting in less residual information and possibly a more efficient compression.

Since at the decoder, the current block is not available since it is being decoded, for the purpose of motion vector refinement, a template is used, which is an estimate of the current block and which is constructed based on the already processed (i.e. coded at the encoder side and decoded at the decoder side) image portions.

First, an estimate of the first motion vector MV0 and an estimate of the second motion vector MV1 are received as input at the decoder 200. At the encoder side 100, the motion vector estimates MV0 and MV1 may be obtained by block matching and/or by search in a list of candidates (such as merge list) formed by motion vectors of the blocks neighboring to the current block (in the same picture or in adjacent pictures). MV0 and MV1 are then advantageously signaled to the decoder side within the bitstream. However, it is noted that in general, also the first determination stage at the encoder could be performed by template matching which would provide the advantage of reducing signaling overhead.

At the decoder side 200, the motion vectors MV0 and MV1 are advantageously obtained based on information in the bitstream. The MV0 and MV1 are either directly signaled, or differentially signaled, and/or an index in the list of motion vector (merge list) is signaled. However, the present disclosure is not limited to signaling motion vectors in the bitstream. Rather, the motion vector may be determined by template matching already in the first stage, correspondingly to the operation of the encoder. The template matching of the first stage (motion vector derivation) may be performed based on a search space different from the search space of the second, refinement stage. In particular, the refinement may be performed on a search space with higher resolution (i.e. shorter distance between the search positions).

An indication of the two reference pictures RefPic0 and RefPic1, to which respective MV0 and MV1 point, are provided to the decoder as well. The reference pictures are stored in the decoded picture buffer at the encoder and decoder side as a result of previous processing, i.e. respective encoding and decoding. One of these reference pictures is selected for motion vector refinement by search. A reference picture selection unit of the encoder and decoder, respectively, is configured to select the first reference picture to which MV0 points and the second reference picture to which MV1 points. Following the selection, the reference picture selection unit determines whether the first reference picture or the second reference picture is used for performing of motion vector refinement. For performing motion vector refinement, the search region in the first reference picture is defined around the candidate position to which motion vector MV0 points. The candidate search space positions within the search region are analyzed to find a block most similar to a template block by performing template matching within the search space and determining a similarity metric such as the sum of absolute differences (SAD). The positions of the search space denote the positions on which the top left corner of the template is matched. As already mentioned above, the top left corner is a mere convention and any point of the search space such as the central point can in general be used to denote the matching position.

According to the above mentioned document JVET-D0029, the decoder-side motion vector refinement (DMVR) has as an input the initial motion vectors MV0 and MV1 which point into two respective reference pictures RefPict0 and RefPict1. These initial motion vectors are used for determining the respective search spaces in the RefPict0 and RefPict1. Moreover, using the motion vectors MV0 and MV1, a template is constructed based on the respective blocks (of samples) A and B pointed to by MV0 and MV1 as follows:

Template=function((Block $A$,Block $B$)).

Figure 3:
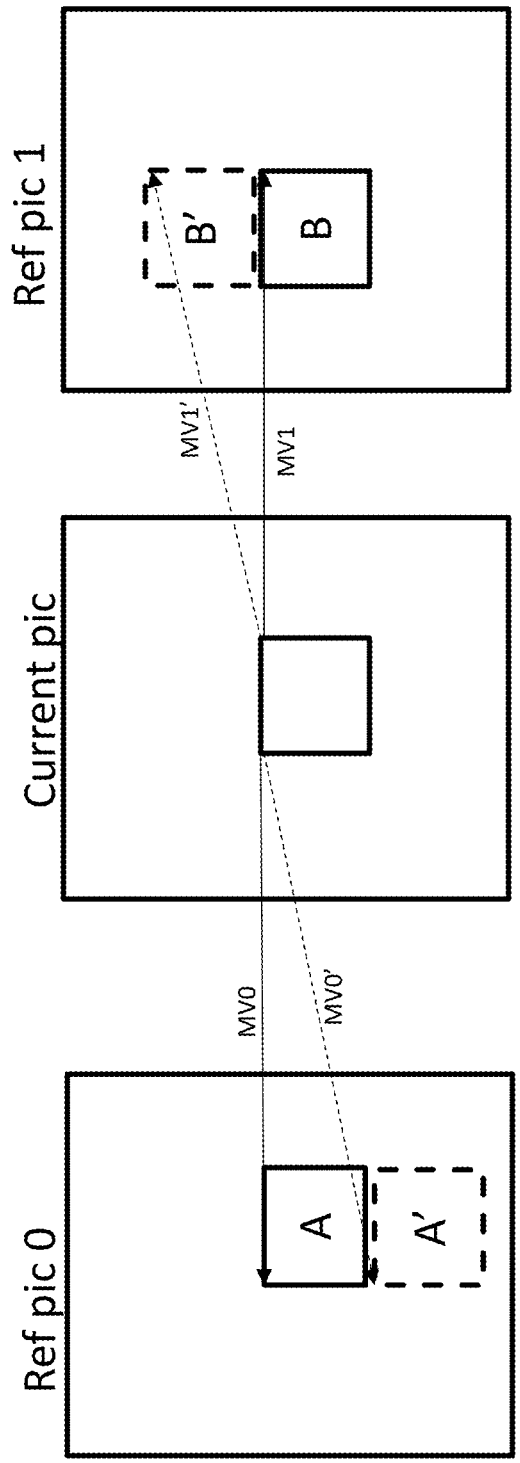
FIG. 3 is a schematic drawing illustrating an exemplary template matching suitable for bi-prediction.

The function may be sample clipping operation in combination with sample-wise weighted summation. The template is then used to perform template matching in the search spaces determined based on MV0 and MV1 in the respective reference pictures 0 and 1. The cost function for determining the best template match in the respective search spaces is SAD(Template, Block candA'), where block candA' is the candidate coding block which is pointed by the candidate MV in the search space spanned on a position given by the MV0. FIG. 3 illustrates the determination of the best matching block A' and the resulting refined motion vector MV0'. Correspondingly, the same template is used to find best matching block B' and the corresponding motion vector MV1' which points to block B' as shown in FIG. 3. In other words, after the template is constructed based on the block A and B pointed to by the initial motion vectors MV0 and MV1, the refined motion vectors MV0' and MV1' are found via search on RefPic0 and RefPic1 with the template.

Motion vector derivation techniques are sometimes also referred to as frame rate up-conversion (FRUC). The initial motion vectors MV0 and MV1 may generally be indicated in the bitstream to ensure that encoder and decoder may use the same initial point for motion vector refinement. Alternatively, the initial motion vectors may be obtained by providing a list of initial candidates including one or more initial candidates. For each of them a refined motion vector is determined and at the end, the refined motion vector minimizing the cost function is selected.

Figure 4:
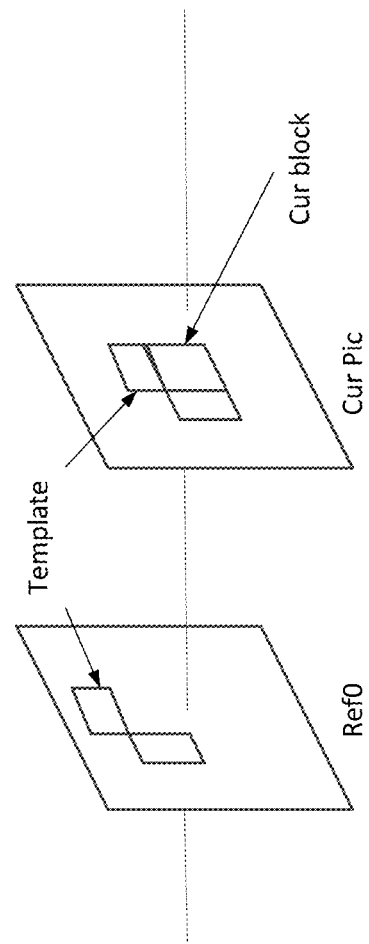
FIG. 4 is a schematic drawing illustrating an exemplary template matching suitable for uni- and bi-prediction.

It is further noted that the present invention is not limited to the template matching as described above with reference to FIG. 3. FIG. 4 illustrates an alternative template matching which is also applicable for uni-prediction. Details can be found in document JVET-A1001, an in particular in Section "2.4.6. Pattern matched motion vector derivation" of document JVET-A1001 which is titled "Algorithm Description of Joint Exploration Test Model 1", by Jianle Chen et. al. and which is accessible at: http://phenix.it-sudparis.eu/jvet/. The template in this template matching approach is determined as samples adjacent to the current block in the current frame. As shown in FIG. 1, the already reconstructed samples adjacent to the top and left boundary of the current block may be taken, referred to as "L-shaped template".

Figure 5:
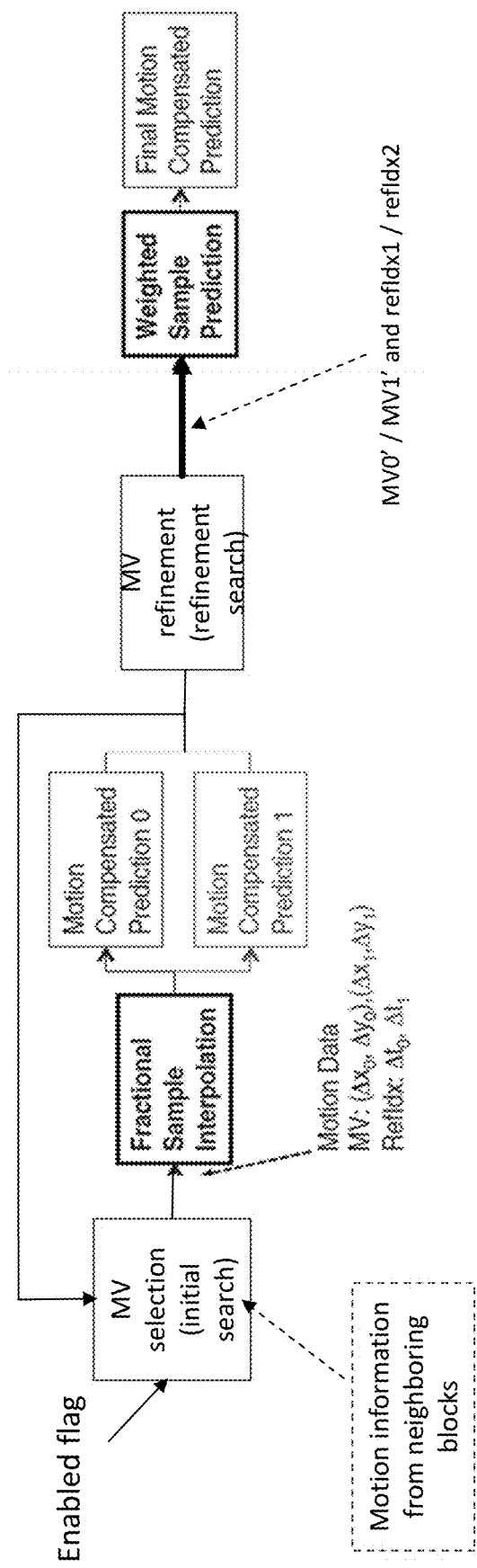
FIG. 5 is a block diagram illustrating stages of motion vector derivation operating without providing initial motion vectors to be refined in the bitstream.

FIG. 5 illustrates another type of motion vector derivation which may also be used. The input to the motion vector derivation process is a flag that indicates whether or not the motion vector derivation is applied. Implicitly, another input to the derivation process is the motion vector of a neighboring (temporally or spatially) previously coded/reconstructed block. The motion vectors of a plurality of neighboring blocks are used as candidates for the initial search step of motion vector derivation. The output of the process is MV0' (possibly also MV1', if bi-prediction is used) and the corresponding reference picture indices refPict0 and possibly refPict1 respectively. The motion vector refinement stage then includes the template matching as described above. After finding the refined one (uni-prediction) or more (bi-prediction/multi-frame prediction) motion vectors, the predictor of the current block is constructed (for bi/multi-prediction by weighted sample prediction, otherwise by referring to the samples pointed to by MV refined).

The present invention is not limited to the two matching methods (examples of template matching) described above. As an example a third matching method which is called bilateral matching (also described in the document JVET-A1001), can also be used for motion vector refinement and the invention applies similarly. Bilateral matching is explained with reference to FIG. 6.

Figure 6:
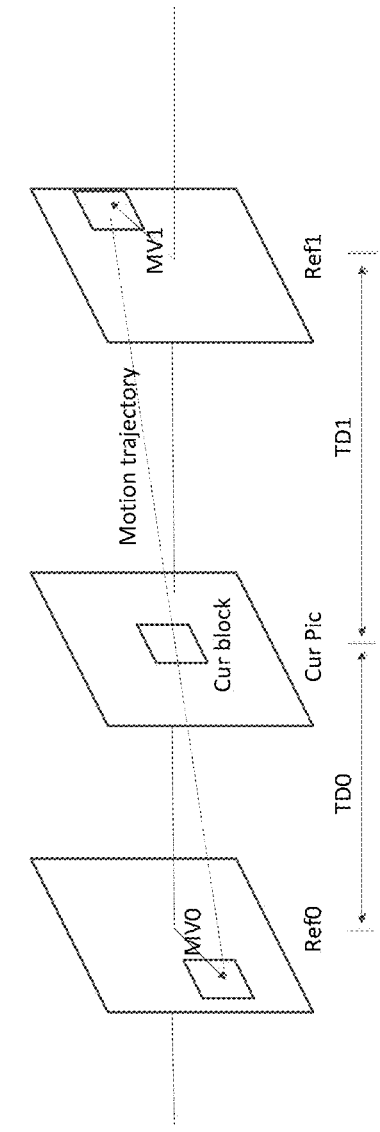
FIG. 6 is a schematic drawing illustrating the concept of bilateral matching.

According to bilateral matching, best match between two blocks along the motion trajectory of the current block in two different reference pictures is searched. As shown in FIG. 6, the bilateral matching is used to derive motion information of the current block by finding the closest match between two blocks along the motion trajectory of the current block in two different reference pictures. In bilateral matching a cost function such as SAD(Block cand0', Block cand1') might be used where Block cand0' is pointed by MV0 and Block cand1' is pointed by MV1.

In order to reduce the computational expense, for selecting suitable candidates (candidate pairs) of motion vectors, for which the cost functions are computed and compared, it may be meaningful to consider the fulfilment of the following condition. Under the assumption of continuous motion trajectory, the motion vectors MV0 and MV1 pointing to the two reference blocks shall be proportional to the temporal distances, i.e., TD0 and TD1, between the current picture and the two reference pictures. As a special case, when the current picture is temporally between the two reference pictures and the temporal distance from the current picture to the two reference pictures is the same, the motion vector differences between motion vectors of plural pairs referring to one reference picture and the respective motion vectors of the pairs referring to the other reference picture shall mirror each other.

Figure 7:
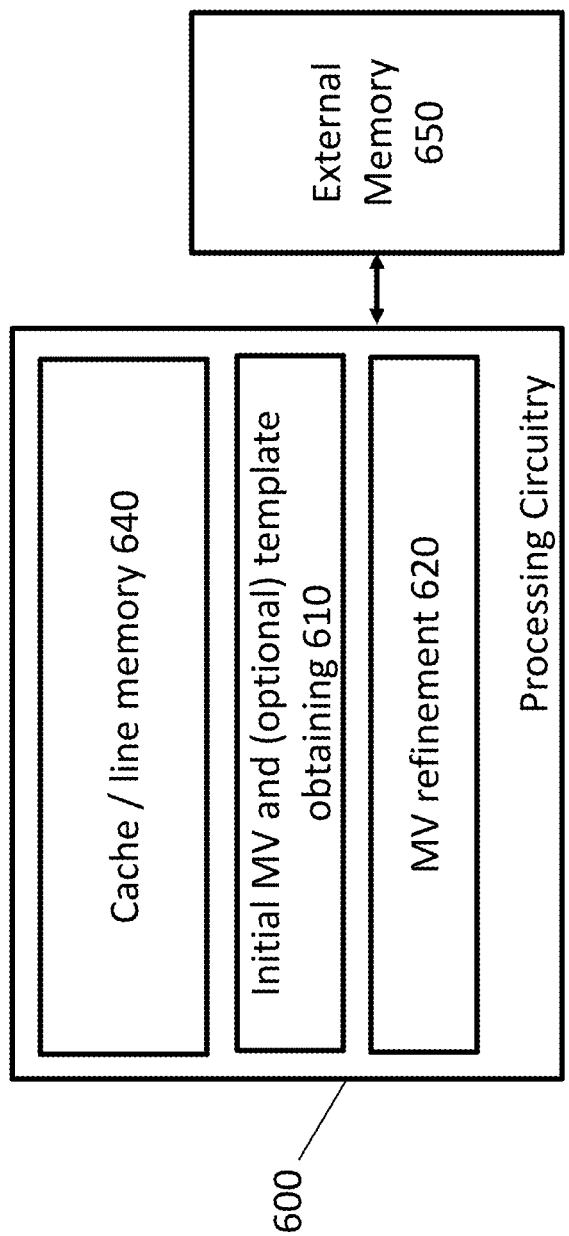
FIG. 7 is a block diagram illustrating an exemplary hardware to implement an embodiment of the invention.

The processing circuitry 600 is illustrated in FIG. 7. The processing circuitry may include any hardware and the configuration may be implemented by any kind of programming or hardware design of a combination of both. For instance, the processing circuitry may be formed by a single processor such as general purpose processor with the corresponding software implementing the above steps. On the other hand, the processing circuitry may be implemented by a specialized hardware such as an ASIC (Application-Specific Integrated Circuit) or FPGA (Field-Programmable Gate Array) of a DSP (Digital Signal Processor) or the like.

The processing circuitry may include one or more of the above mentioned hardware components interconnected for performing the above motion vector derivation. The processing circuitry 600 includes computation logic which implements two functionalities: obtaining the initial motion vector (or a plurality of initial motion vectors if bi-/multi-prediction is used) and a template if template matching is used 610 and motion vector refinement 620. These two functionalities may be implemented on the same piece of hardware or may be performed by separate units of hardware such as initial motion vector and a template determination unit 610 and motion vector refinement unit 620. The processing circuitry 600 may be communicatively connected to an external memory 650 in which the reconstructed reference picture samples are stored. Moreover, the processing circuitry 600 may further include an internal memory 640 which buffers the samples in a window transferred from the external memory and used for the motion vector determination for the currently processed block. The processing circuitry may be embodied on a single chip as an integrated circuit.

It is noted that the processing circuitry may implement further functions of the encoder and/or decoder described with reference to FIGS. 1 and 2. The internal memory 640 may be an on-chip memory such as a cache or a line memory. Chip memory is advantageously implemented on the encoder/decoder chip to speed up computations. Since the size of the chip is limited, the on-chip memory is usually small. On the other hand, the external memory 650 can be very large in size, but the access to external memory 650 consumes more energy and the access is much slower. Usually the all necessary information is retrieved from the external memory 650 to on-chip memory 640 before the computations are performed. Worst case external memory access (or bandwidth that needs to be provisioned when designing the memory bus), denotes the largest possible amount of memory transfer between external memory 650 and the chip, while decoding a frame or coding unit. The memory (especially the external memory) can usually only be accessed in predefined block units. In other words it is generally not possible to access a single pixel, instead a smallest unit (e.g. 8×8) must be accessed. The on-chip memory size is also an important design consideration, as a larger on chip memory increases the cost.

In some embodiments, the above mentioned apparatus may be an integrated circuit further comprising: an internal memory embedded within the integrated circuit and a memory access unit (interface) for fetching integer samples located within said window from an external memory to the internal memory.

The term "prediction block" herein refers to the current block which is to be predicted. It is a block within the image which may be obtained by subdividing the image into equally sized or differently sized (for instance by hierarchical partitioning of a coding tree unit, CTU into the smaller units) blocks. The block may be square or more generally rectangular as these are the typical shapes also employed in current encoders/decoders. However, the size or the shape of the block in accordance with the present disclosure is not intended to be limited by the examples of them described and illustrated here.

In various embodiments, the apparatus including the processing circuit may be the encoder or decoder or even an apparatus including such encoder or decoder, for instance a recording device and/or a playback device.

Fractional sample positions are positions between the real picture sample positions obtained by reconstructing the reference picture which was coded as shown in FIG. 1. Thus, the fractional positions must be obtained by interpolation based on the nearest integer positions. Details of interpolation filtering can be found in Section "5.3 Fractional Sample Interpolation" of High Efficiency Video Coding (HEVC) book by V. Sze et. al., Springer, 2014.

Interpolation filtering usually applies different filters in order to generate different fractional pel (sample) positions. As an example following 1D separable filters are applied to generate quarter pel and half pel positions in H.265 video compression standard:

| Phase | Luma filter coefficients |
|---|---|
| 1/4 | [−1, 4, −10, 58, 17, −5, 1]/64 |
| 1/2 | [−1, 4, −11, 40, 40, −11, 4, −1]/64 |

As can be seen from the above table, the interpolation filtering requires several samples around the fractional pel position, corresponding to the filter taps (number of coefficients in the table). Using the example filters above in order to generate a half pel position 4 integer samples from left/top and right/bottom are required. It should be noted that the length of the interpolation filter is different for quarter pel sample positions (which is 7 tap) than the half pel sample positions (which is 8 tap). The terms sample, pel and pixel are used interchangeably in this application, denoting an image sample (in one or more color components) at a given time instance. A sample is in principle an intensity value.

In some embodiments, the interpolation filter of a predefined tap-size assesses integer samples only within a window given by integer samples accessible for the template matching in said search space. The window might include much more samples than the ones actually used in computations of a certain prediction block. This is due to the fact that the refinement search operation is usually implemented using a fast search method (as opposed to the brute force search method), according to which some of the samples are not evaluated depending on the gradual progression of the search operation. As a result the number of template matching iterations as well as the samples that are used in computations for refinement search operation might change for each prediction block.

Figure 8:
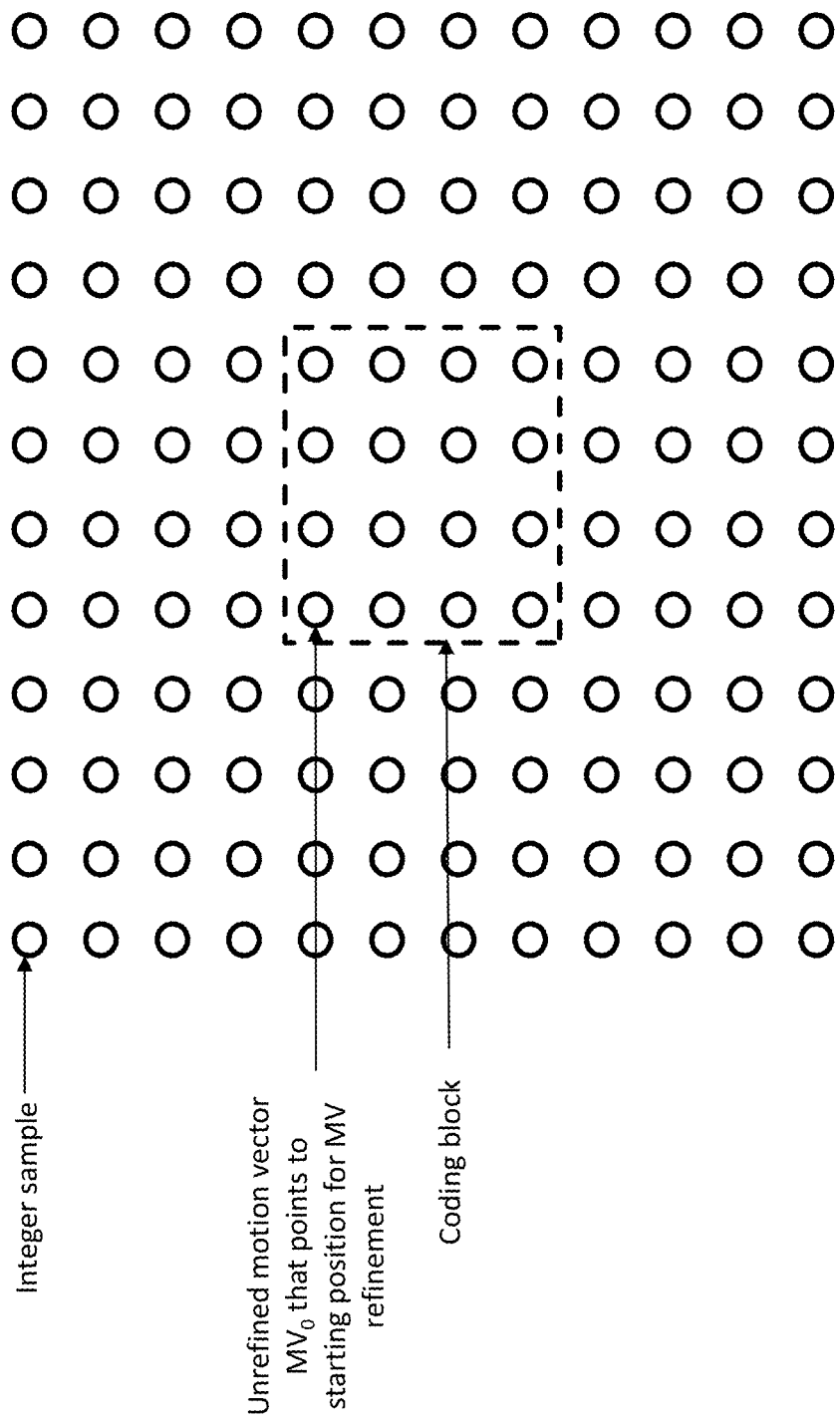
FIG. 8 is a schematic drawing illustrating for a coding block an exemplary window with samples which should be available to be accessed.

FIG. 8 illustrates a coding block (prediction block) and the corresponding samples of the window. It is noted that the samples shown in FIG. 8 are reference picture samples and the coding block shown in FIG. 8 is actually a block corresponding in size and position to the current block in the current frame for which the motion vector is to be derived in the reference picture. Thus, in fact, the coding block in FIG. 8 is a block co-located to the block for which the predictor is searched. However, for the simplicity reason, this block is referred as "coding block" in the following.

In this example, unrefined motion vector MV0 points to an integer sample position. In this example, a motion vector refinement search granularity is 1 integer sample, meaning that since the starting point is an integer sample, only integer sample points are searched. The search is performed, in this example, in a gradually developing search space. This means that the search space is in each iteration advanced by adding new search positions depending on the best direction in terms of cost function for the previously tested positions.

Figure 9:
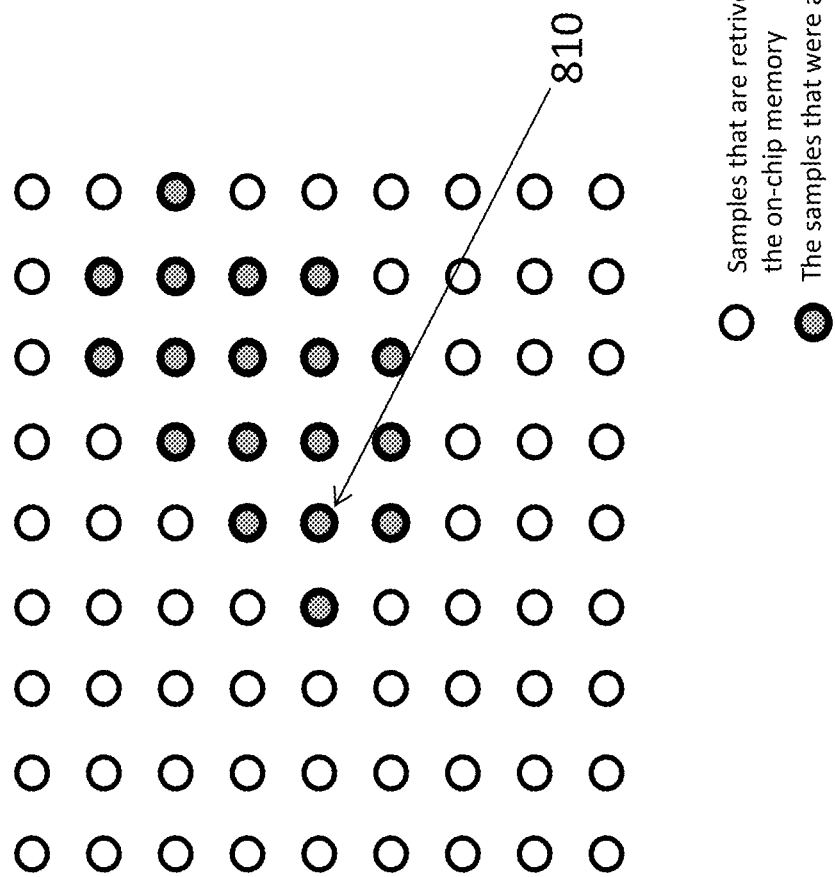
FIG. 9 is a schematic drawing illustrating iterative search space.

Such approach is illustrated in a simplified manner in FIG. 9. In FIG. 9, the initial motion vector pointed to the center point 810. The search space is gradually constructed around the initial motion vector position. In the first step, four positions immediately adjacent on the top, bottom, left and right to the position 810 pointed to by the initial motion vector as well as the position 810 pointed to by the initial motion vector are tested. Based on the direction which results in a lowest cost function among the tested five points, further positions to be tested are added to the search space. In this example, the lowest cost function could be seen in the right point and so the search space was extended by three further points in the horizontal right direction in the second step. In the second step the lowest cost function could be seen in right point (with respect to the lowest cost point of the first step), resulting in a further extension of the search space by three points in the horizontal right direction. In the third step the lowest cost function is observed again in the right point with respect to the lowest cost point of step 2 and results in the extension of the search space by three more points in the horizontal right direction. According to the example in FIG. 9, three more steps are performed in the top, top and right directions in that order. In the example a diamond shaped pattern (consisting of 5 search points) is used for each iteration and the search space is extended in order to complete the missing search points at each step.

In each iteration of the search space determination, the search space may grow by one or more integer sample position. Returning now to FIG. 8 in the example of which the maximum number of search iterations is 4. Since the maximum number of 4 iterations are possible, all of the samples depicted on the left need to be retrieved from the memory to perform the search operation, in case the gradual development of the search space goes to the left. Similarly, 4 samples extension to the top is needed. Thus, the search space is extended in both directions (left-right and top-bottom) since the refined MV can move in either direction and the hardware implementations require that all of the samples that might be required are fetched from external memory before the application of refinement search. If the search space develops in the bottom or right direction, extension by 4 further samples is necessary since the template matching with a template corresponding to the size of the coding block (prediction block) will need to access some of those samples. Moreover, the corner samples (e.g. top-right) must also be fetched from the memory, since hardware implementations typically cannot fetch irregular shapes (rectangular access is more feasible).

It is noted that the above described iterative search space development is only exemplary and the rules and number of points to extend the search space in each iteration may differ, i.e. be specified in a different way.

FIG. 9 also shows a scenario which may occur due to the external memory access rules described above. The number of samples that are fetched from the external memory is much higher than the samples that are actually used in the computation step. Assuming that the template here is only one sample large (for simplicity reason), the white circles represent samples that are retrieved from the external memory and the shaded samples that are actually used. However, such redundancy is necessary if the number of accesses to the external memory is to be kept low since when the current block is started to be processed, the actually needed samples are not yet known.

It is noted that the search space may also be defined in a different way, for instance as a stabile shape located at the position pointed to by the initial motion vector. The shape may be any shape such as square, rectangle, diamond, or the like.

Figure 10:
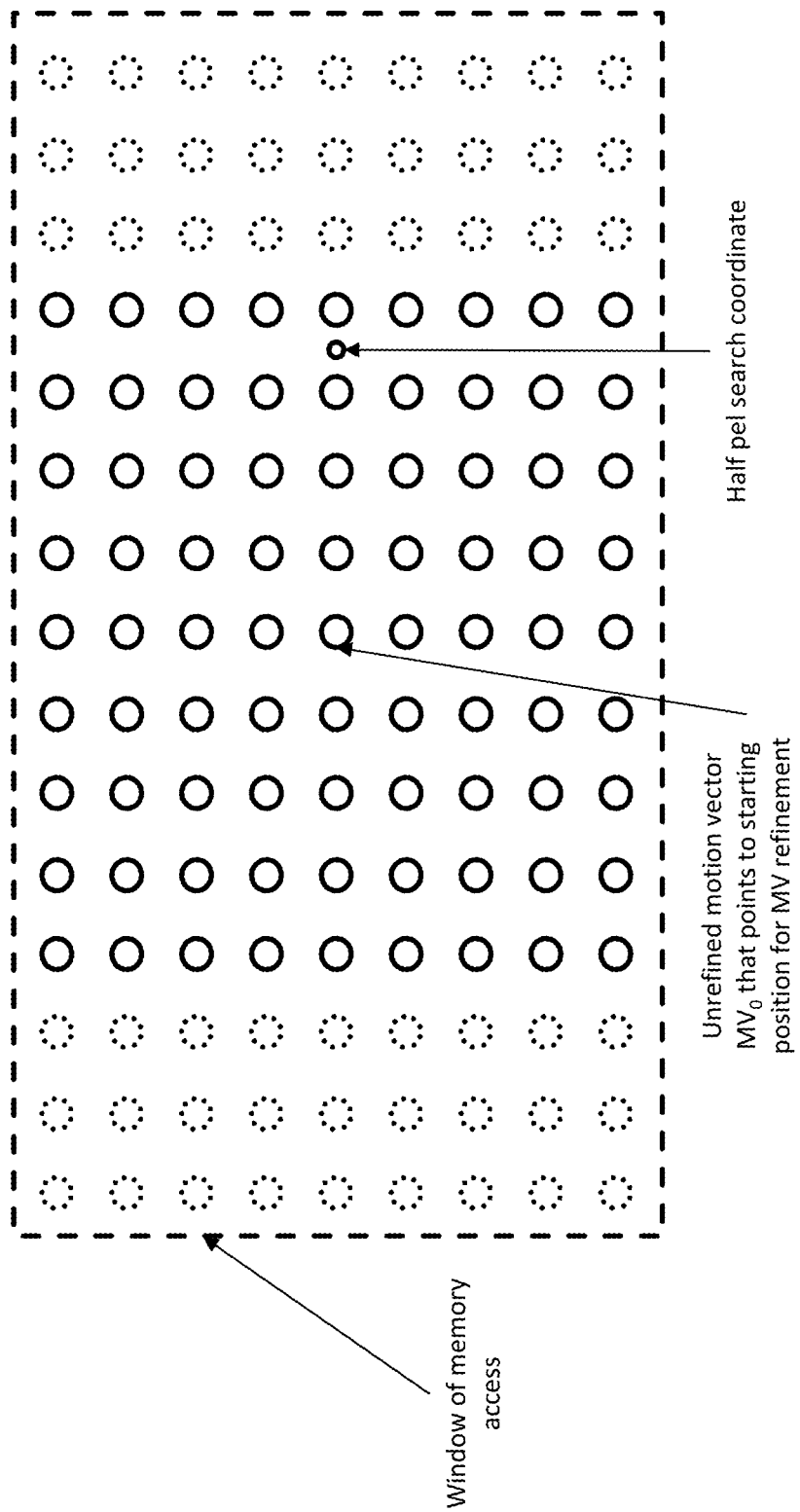
FIG. 10 is a schematic drawing illustrating extension of the memory access window in horizontal direction due to interpolation filtering.

FIG. 10 illustrates an example in which the search space may also include fractional samples. In FIGS. 8 and 9, the motion vector search was performed on integer samples resulting in the positions indicated by solid-line larger dots included in the access window. If now the search is performed on a sample that has half-pel resolution (smaller solid-line dot), in order to generate the fractional sample, depicted on the left hand side, three more columns of samples need to be retrieved from the memory as well, assuming that the interpolation filter is symmetric and has eight taps. Moreover same must be applied on the left side (extension by 3 columns of pixels) due to the fact that search operation is symmetric (can move iteratively to the left and right) so that a fractional pixel may be located on the left side of the window.

As a result due to interpolation filtering the number of samples necessary to be retrieved from the memory is further increased, indicated by the dashed line now also included the dotted-line circles representing the positions added due to fractional interpolation. Similarly if one allows half per positions in the vertical direction to be searched as well, the window of samples to be accessed from the memory needs to be extended in the vertical direction too (not shown in the example of FIG. 10), on the top and bottom sides.

Window of memory access is defined as the rectangle that encloses all of the samples that need to be retrieved from the memory in order to perform the motion vector search for a prediction block (coding block). The window of memory access not only includes the actual samples that are required, but also all of the remaining samples that have the possibility of being accessed during the motion vector search operation. In the example of FIG. 9, the motion vector search moved to the right. But it could have been moved to the left direction as well, which is not known beforehand. Accordingly, in order not to access the external memory several times, the window of memory access (or access window) includes all samples accessible by the respective processing.

In order to achieve this, the present disclosure performs padding of the samples which are located outside the memory access window if these are needed, for instance, to interpolate fractional samples.

The provision of replacement samples (padding samples) may be further advantageous in connection with template matching on search spaces which also include fractional samples. In other words, the search space for a prediction block may include at least one fractional sample position with a value obtained by interpolation filtering with a filter of a predefined tap-size. The interpolation filtering uses sample position values from the window and the at least one replacement value to obtain the at least one fractional sample position value.

Figure 11:
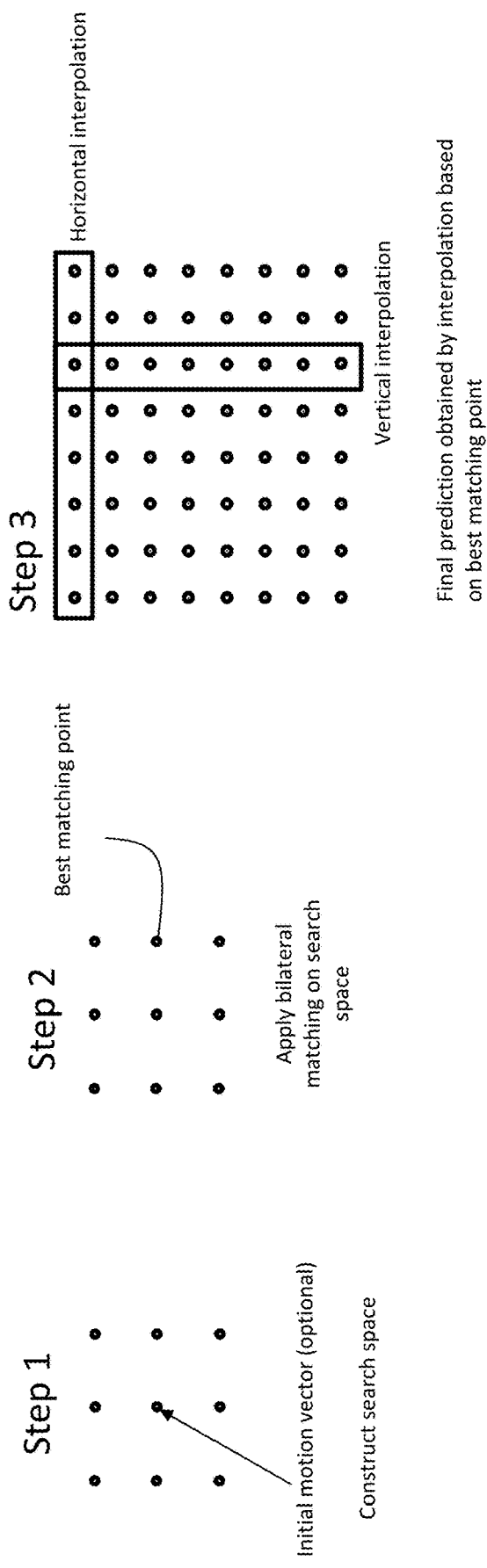
FIG. 11 is an illustration of a conventional scheme of performing motion vector refinement based on a search space and obtaining a prediction by interpolation.

FIG. 11 illustrates the basic steps of a known scheme of performing motion vector derivation/refinement as outlined before. In a first step (Step 1), a "search space" of at least two candidate motion vectors (in the illustrated example, there are nine candidate motion vectors) is obtained. Optionally, one of the candidate motion vectors forming the search space can be considered as an initial motion vector (in accordance with the terminology used in the present application also called "anchor" motion vector or anchor candidate motion vector). The initial or anchor motion vector can, for instance, be a motion vector which is included in a bitstream and explicitly or implicitly signaled to the decoder.

In the following step (Step 2), a matching process is applied on the search space in order to find the best matching point of the search space (in other words, the point of the search space minimizing the cost function, corresponding to the most appropriate candidate motion vector). In the illustrated example, bilateral matching is applied, however, other schemes for determining the cost function such as template matching can be equally applied.

The final step of the drawing (Step 3), the final prediction is obtained by interpolation on the basis of the most appropriate candidate motion vector selected according to the processing in Step 2.

Figure 12:
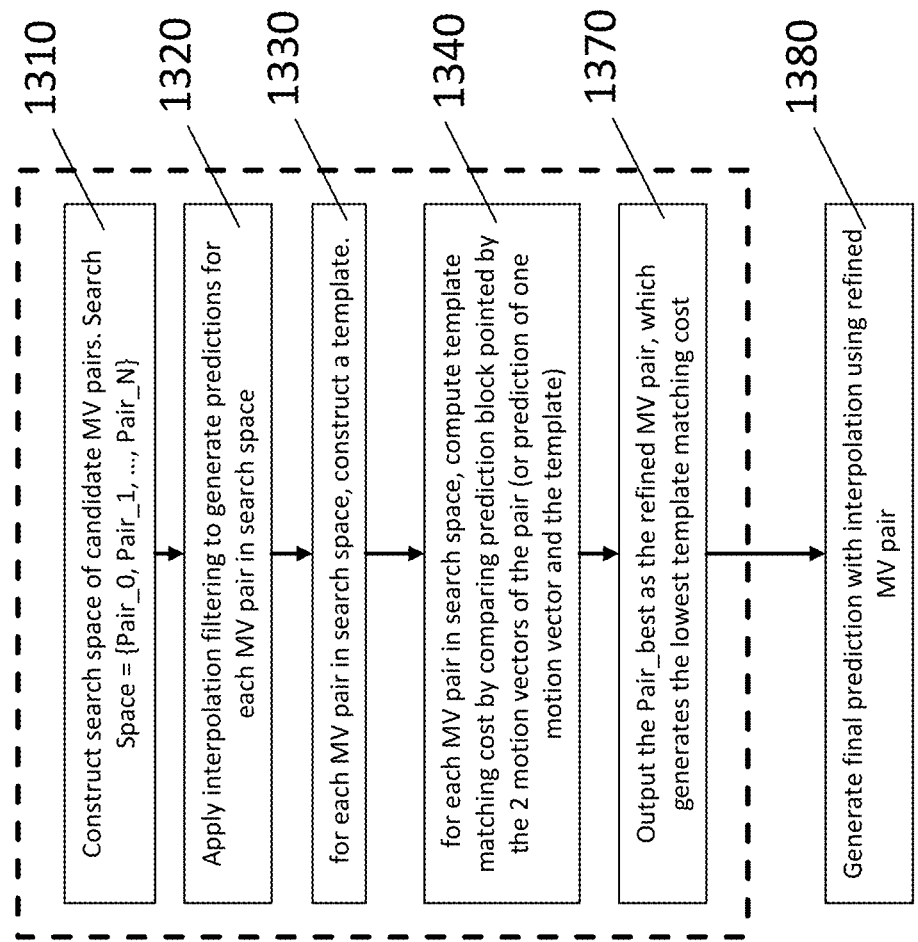
FIG. 12 is a flowchart illustrating the motion vector derivation and obtaining prediction according to the conventional example of FIG. 11.

The concept of FIG. 11 is further described in the flow diagram of FIG. 12. In FIG. 12, illustration is given specifically for the case of candidate motion vector pairs, i.e. for bilateral matching (also applicable when template matching is, for instance, used in bi-directional prediction, such as illustrated above with reference to FIG. 3).

In the first step (1310), a search space of candidate motion vector pairs is constructed. This step corresponds to "Step 1" of FIG. 11.

In the following step (1320) prediction generated for each motion vector pair in the search space, by applying interpolation filtering. In the following step (1330), for each motion vector pair in the search space, a template is constructed (obtained). As explained above, this step is optional, i.e. it is necessary only in case of template matching but not for bilateral matching. In the following step (1340), for each motion vector pair the search space, a template matching cost (or bilateral matching cost) is computed by comparing the prediction blocks pointed to by the two motion vectors of the pair (or the prediction block of one candidate motion vector and the template). In the following step (1370), the resulting motion vector pair minimizing the template or bilateral cost function (more generally: best matching, i.e. being obtained as most appropriate by the matching process) is selected and output as the motion vector pair for the prediction block. In accordance with the terminology explained above, this may be called a "refined motion vector pair". The foregoing steps 1320, 1330, 1340, and 1370 correspond to "Step 2" of FIG. 11.

The following step (1380) generates the final prediction with interpolation using the motion vector pair selected in step 1370. This step corresponds to "Step 3" of FIG. 11.

Figure 13:
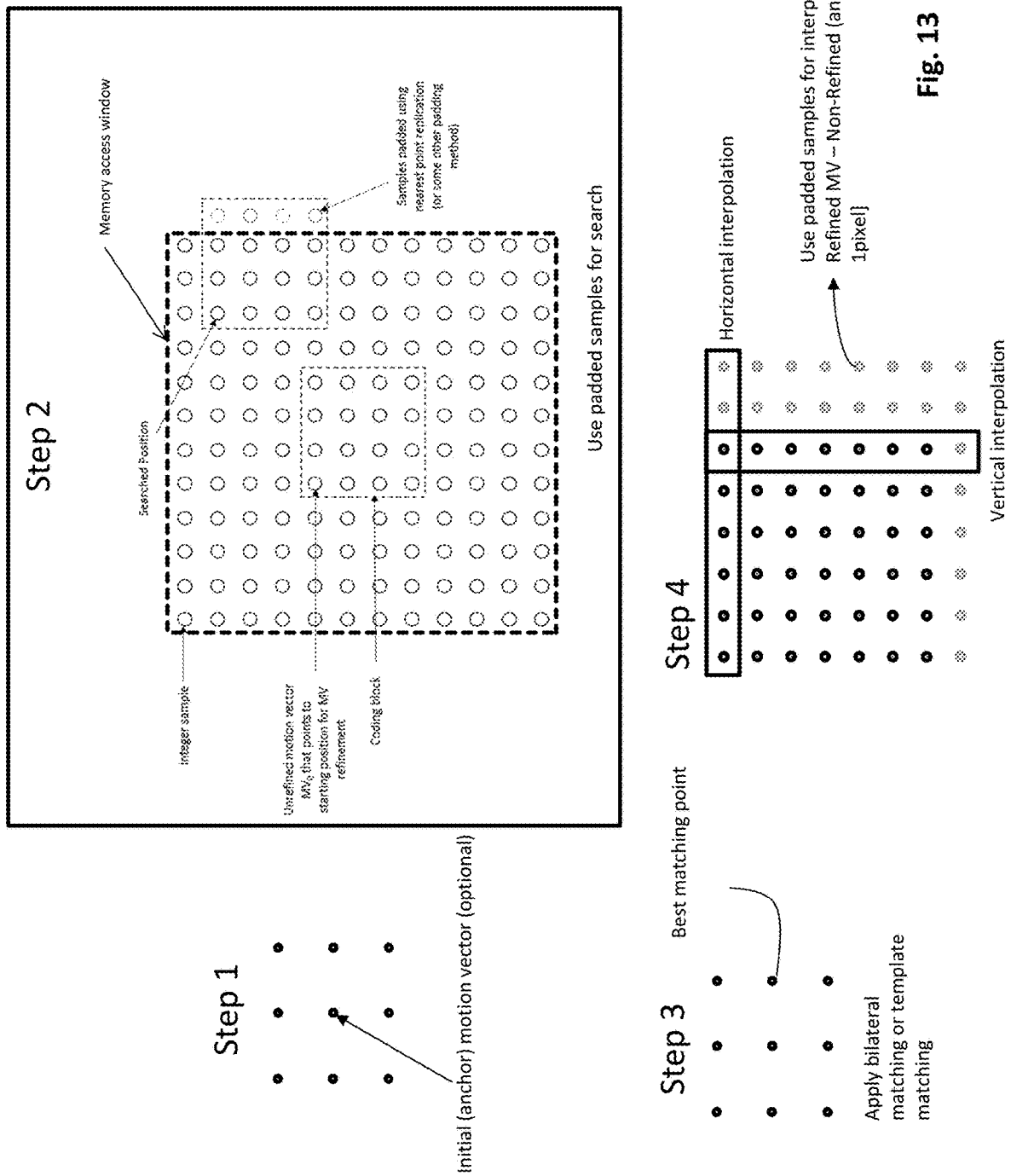
FIG. 13 is an illustration of the scheme for performing motion vector refinement based on a search space and obtaining prediction by interpolation in accordance with exemplary embodiments of the present invention.

FIG. 13 illustrates the processing for motion vector refinement and final prediction generation in accordance with exemplary embodiments of the present invention. The major difference between the approach of FIG. 13 and the conventional approach illustrated in FIG. 11 resides in that the approach according to FIG. 13 of the present invention makes use of sample padding for both motion vector refinement and the final generation of the predictor using interpolation filtering.

Using padded samples for motion vector refinement (optional) is illustrated in additional Step 2, which will be described in more detail below with reference to FIGS. 14 to 18. Thereby, even in case of candidate motion vectors having fractional coordinates (i.e. a search spaces fractional coordinates), the desired candidate blocks for performing the bilateral or template matching can be performed by using a predefined limited access window, same as in case of a search space including only integer points. The actual derivation of a cost function by applying bilateral or template matching is performed in Step 3, same as Step 2 of FIG. 11.

Further, padding of samples is (also or only) used in final Step 4 for performing the actual predictor generation. This step generally corresponds to Step 3 of FIG. 11 but differs therefrom by using the concept of padding. Specifically, in the given example the sample values located in the two rightmost columns and in the bottom row are not accessed but padded with padding sample values based on the accessed other sample values.

The amount of samples to be padded (replaced with replacement values due to non-availability) depends on the difference between the finally selected ("refined") motion vector and see initial ("anchor") motion vector. In the illustrated example, this difference is two pixels in the vertical and one pixel in the horizontal direction. In accordance therewith, for horizontally and vertically interpolating a pixel at the crossing point of the two rectangles in the illustration of Step 5, the sample values of the two right-hand columns of pixels as well as the bottom row of pixels are not available and must be replaced (padded) by replacement values in accordance with predetermined rules as set forth above and discussed in further detail below.

Advantageously, if padding is used for the search in Step 2 as well, the same access window is used for both the interpolation filtering operations in Step 2 and Step 4.

Advantageously the memory access windows that are used in Step 2 and Step 4 of FIG. 13 are determined based on a particular candidate motion vector in the search space. The particular motion vector (called anchor motion vector) can, for instance, be a motion vector which is included in a bitstream and explicitly or implicitly signaled to the decoder. The selection determination of the anchor motion vector is carried out according to a predefined rule that is known to both encoder and decoder.

Figure 14:
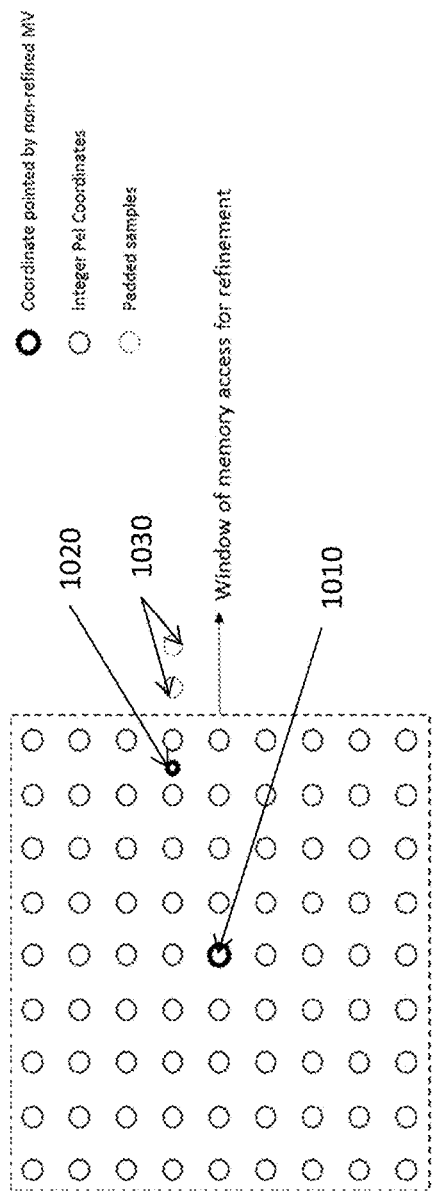
FIG. 14 is a schematic drawing illustrating padding of two samples to enable fractional position calculation.

FIG. 14 shows a window of memory access for the purpose of motion vector refinement. The window is spanned around the point 1010 in the center which is the position pointed to by the initial motion vector. Moreover, fractional position 1020 also belongs to the search space. However, the fractional position 1020 is to be interpolated by a 6 tap filter using 3 integer sample positions to the left of the fractional position and three integer sample positions to the right of the fractional position. Since the fractional position 1020 is located on a line with the integer sample positions, a one-dimensional filter may be applied for interpolation, for instance one as shown in the above example described with reference to FIG. 10. As can be seen in FIG. 14, in order to interpolate the fractional sample 1020 two further sample positions 1030 would be necessary which are located out of the window. In order to avoid additional loading of these samples from the external memory, according to the present disclosure, the values of the window-extern positions 1030 are replaced with values which are obtained on the basis of the samples within the window.

FIG. 14 illustrates fractional sample position 1020 which is in the middle between two integer sample positions and thus a half-pixel (half-pel) position. However, the present disclosure can equally be applied to other fractional positions such as quarter or ⅛ positions. Moreover, sample position 1020 is located on a horizontal line corresponding to a row of the integer sample positions so that horizontal 1D filtering can be used for its interpolation. However, the present disclosure is not limited to such fractional positions. Rather, fractional positions may be located on a vertical line corresponding to a column of the integer sample positions so that vertical 1D filtering can be used for its interpolation. Moreover, the fractional positions do not have to be located on the same line of pixels as the integer samples at all. In such case, two-dimensional filtering may be used to interpolate such samples; such 2D filtering may be separable to vertical and horizontal 1D filtering.

Figure 16:
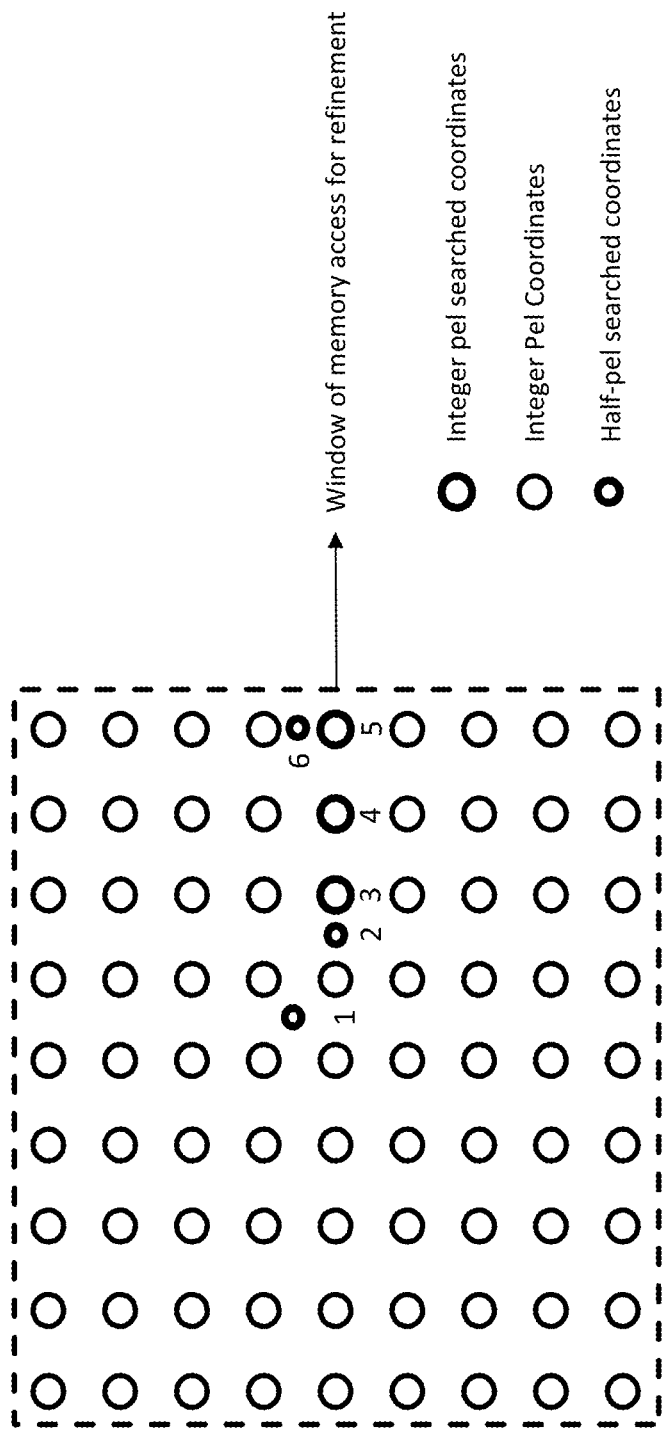
FIG. 16 is a schematic drawing illustrating exemplary fractional positions the interpolation of which does not require padding.

Examples of various fractional positions are shown in FIG. 16. In particular, fractional position 1 is a position for the interpolation of which both horizontal and vertical filtering may be applied because it is not located on line with the rows and columns of the integer sample positions. Position 2 is a position for the interpolation of which only horizontal filtering is used whereas position 6 is a position for the interpolation of which only vertical filtering is used. All fractional positions shown in FIG. 16 can be obtained using only the integer positions within the window.

Figure 18:
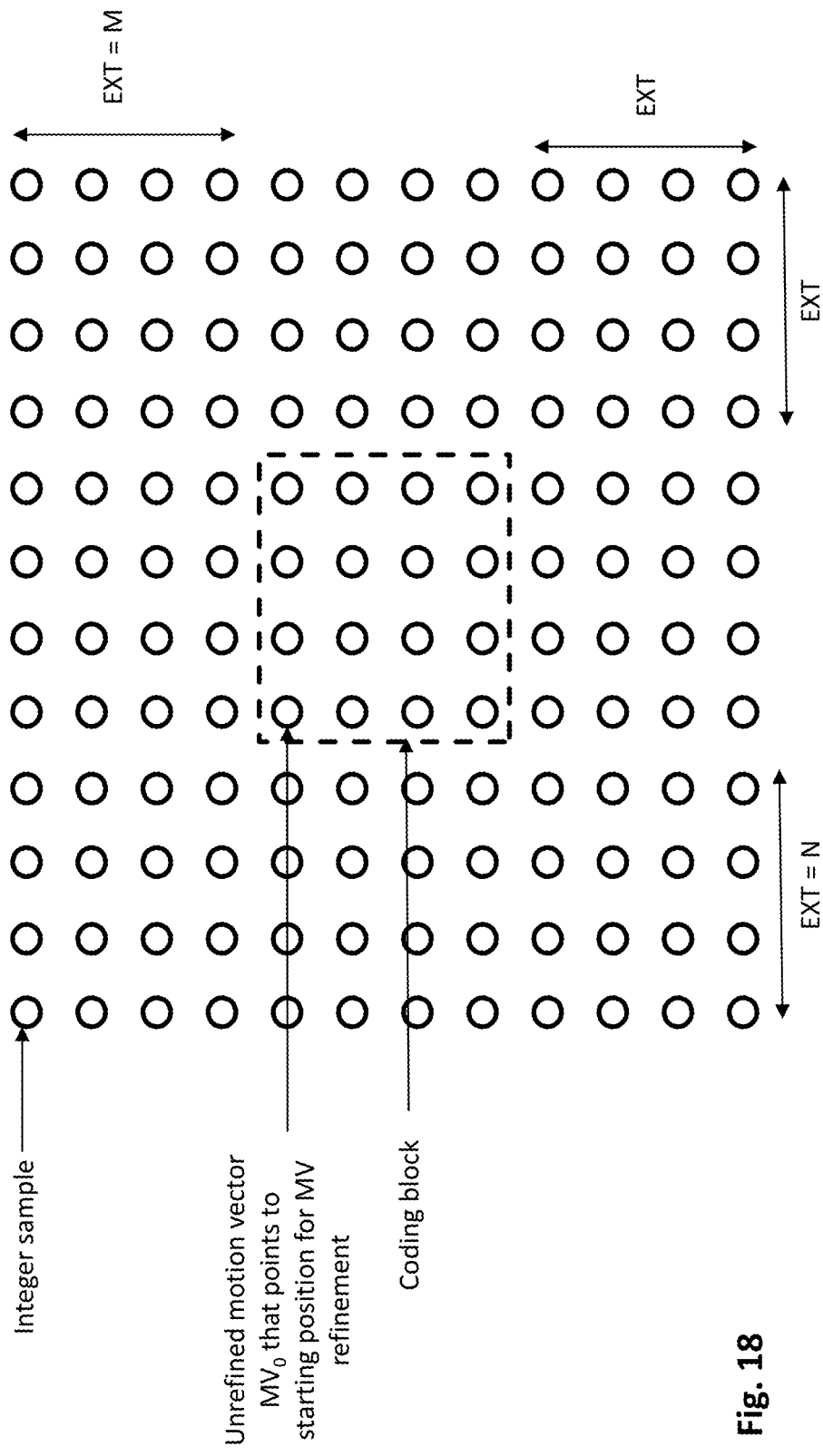
FIG. 18 is a schematic drawing illustrating definition of a memory access window with respect to a prediction unit.

The window for memory access may be defined in various ways. FIG. 18 illustrates an example in which the memory access window is defined as extensions EXT on the left/right or up/down of the coding block (corresponding to the location of the coding block given by the initial motion vector). The extension amounts may depend on the size and the shape of the coding or prediction block. In FIG. 18, the extension is 4 samples long in each direction (top, bottom, left, right). However, it is noted that the EXT may also take different values for the different directions, depending on the block size (which may have different size in vertical and horizontal direction) and/or the search space form and size.

For instance, according to an example, the window is defined as N integer sample columns and M integer sample rows relative to the prediction block initial motion vector, N and M being non-zero integer values. In FIG. 18, the N and M are indicated but have the same size. As mentioned above, N and M may have a different size. N and M are integers and at least one of them is non-zero. Taking parameters N and M and the template form and size, the size of the access window can be determined. In particular, if the template has T1 rows and T2 columns, the size of the memory access window may be calculated as (N+T1+N) rows and (M+T2+M) columns. This is because the search can go N samples left or right resulting in 2N samples horizontally and M samples up or down resulting in 2M samples vertically. In addition, the template can be matched with T1×T2 samples on any of the 2N×2M sample positions.

On the other hand, for specific approaches of search space constructions as the one described with reference to FIGS. 8 and 9, the memory access window can be defined in terms of maximum number of refinement iterations (search space construction iterations) and iteration step size (in terms of maximum sample distance achievable in each iteration), which can be later converted to maximum amount of displacement in left, right, up and down. Therefore the memory access window is defined as the maximum displacement in each direction. For instance, the 4 iterations in which each iteration may advance the search space in maximum one integer sample position result in EXT=4.

In other words, according to this example, the processing circuitry is configured to determine the refinement of the initial motion vector by template matching with said template in a search space which is iteratively extended in a direction given by one (or more) of more best matching positions of the search space in a most recent iteration, the window is defined by a predefined maximum number of the iterations. The same applies mutatis mutandis to the case of bilateral matching.

It is noted that in general, the present disclosure is not limited to any particular shape or form or kind of determination of the search space. In another example, search space is a rectangular sub-window of the window or may be equal to the window. The definition of the memory access window may be relevant in order to possibly include the corresponding signaling parameter into the bitstream (for instance parameter EXT or parameters N and M). However, the memory access window size may also be defined in the standard or derivable on the basis of other coding parameters (such as template size, prediction block size, image resolution, etc.). Returning to FIG. 14, according to an embodiment, a window of memory access for refinement is defined around the position pointed to by the non-refined motion vector 1010. The window identifies the maximum number of pixel samples that need to be accessed from the memory in order to perform motion vector refinement search. The search space here corresponds to the access window. In other words, for the sake of simplicity, in this example the template size is considered 1×1, but it can and in praxis would typically be larger. The window of memory access is usually defined as the extension around the coding block. In this example, it is 4 samples from left/right and 4 samples from top/bottom. If search space position currently tested during template or bilateral matching requires samples from outside of the window of memory access, then samples necessary for reconstruction of the coding block are obtained by padding. This is the case in FIG. 14 for the fractional position 1020. If the template matching is to be performed on this position or using this position, it has to be interpolated using additional padded positions 1030 located outside the window.

Padding samples can be generated, for instance, using one of the methods of:

Nearest sample replication.

Mirroring along the axis of interpolation filtering.

In particular, the nearest sample replication refers to an approach in which the replacement value is determined to be equal to the value on a closest of the accessed integer sample positions. For instance, in FIG. 14, the two missing position values 1030 would be replaced with the value of the sample immediately adjacent to the right of the fractional position 1020 to be interpolated. However, it is noted that this approach is only an example and the present disclosure is not limited to a mere replication of the neighbor. Alternatively, several nearest sample positions may be used to interpolate the missing samples 1030. For example, three samples on the boundary nearest to the missing sample may be used to interpolate the missing sample for instance by weighted averaging with weights set inverse proportional to the distance of the three samples from the missing sample.

The mirroring refers to an approach according to which the replacement value is determined by mirroring the value of the corresponding assessed integer sample position with respect to the axis of the interpolation filter. For example in FIG. 14, the two missing samples 1030 would be replaced with the values of samples to the left of the fractional position 1020. In particular, the second sample to the right of the fractional position 1020 is replaced with the value of the position second to the left of the fractional position 1020, whereas the third sample to the right of the fractional position 1020 is replaced with the value of the position third to the left of the fractional position 1020.

It is noted that a combination of the two above mentioned approaches may also be applied in which the missing samples are a function of the mirrored samples and the nearest sample.

According to an embodiment, the window is formed by all integer sample positions accessible for the template or bilateral matching on integer sample positions within said search space. This is for instance the case for the example of FIG. 14, in which the additional samples outside the window are only necessary for the template matching in non-integer, fractional sample positions. In other words, in FIG. 14, in the above example the half pel coordinate that is to be searched requires a sample outside of the memory access window. As a result padding operation is applied to generate the unavailable samples. However, the present invention is not limited thereto.

Figure 15:
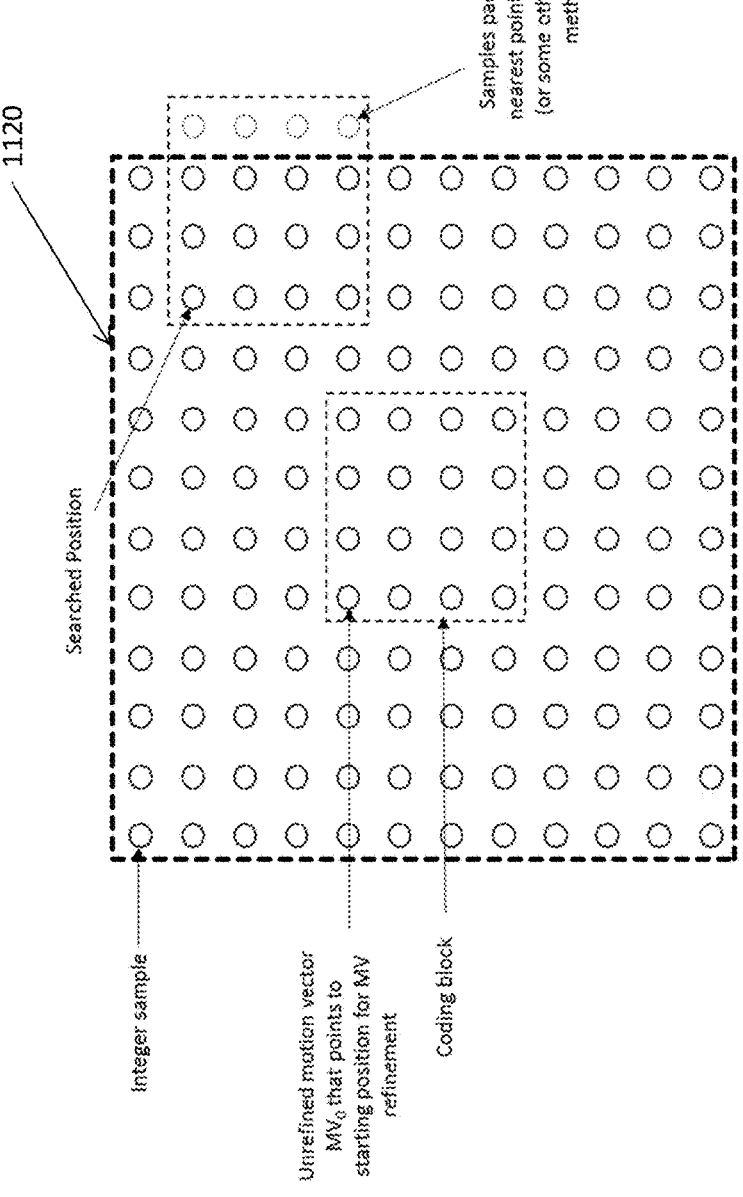
FIG. 15 is a schematic drawing illustrating padding of four samples to enable template matching on the search space boundaries.

FIG. 15 shows an alternative approach in which the window does not include all integer sample positions accessible for the template matching on integer sample positions within said search space. In the previous examples the coding block size was depicted as 1×1 for simplicity. In FIG. 15 the size is 4×4 integer samples. In this example, if the search coordinate (position on which template or bilateral match is to be calculated) points to an integer sample, padding can still be applied if some of the samples in the block lies outside of the memory access window. This approach enables to limit the window size even more.

In detail: FIG. 15 shows window 1120 which includes some of the accessible samples. The initial motion vector points to a position which marks top left corner of a coding block. The search space may be considered here as equal to the window. However, it is noted that it can be in general smaller than the window which also may make sense since if the template is larger than 1×1 integer samples, then necessarily samples apart from those included in the search space will be necessary to perform the template matching.

Nevertheless, if the search space defines the size of the window, alternatively, the missing samples may be padded. In FIG. 15 the exemplary search position in the second row and $10^{th}$ column of the window is shown. Template matching with a 4×4 integer sample large template requires also pixels outside the window. These samples are thus padded, i.e. replaced by values determined or calculated on the basis of the samples within the window. The above mentioned padding approaches such as nearest neighbor or mirroring may be applied.

The window may be defined by its vertical and/or horizontal size with respect to
the search space, or
a block with a size of the prediction block located on the initial motion vector position, or
the initial motion vector position.

An example of window definition is shown in FIG. 18 and described above. This corresponds to determining of the window size based on the size of the prediction block located on the initial motion vector position. Alternatively, the window size may be defined with respect to the initial vector position by the size in one or both of x and y directions. For instance, the window may be defined to be located around the position pointed to by the initial motion vector and extending A integer samples to each of up, down, left, right direction. Alternatively, it may extend A integer samples to the left and right respectively and B integer samples up and down respectively. Further definitions are possible.

It is noted that the above examples were provided for half-pel interpolation. However, the present disclosure is not limited thereto. In general, any fractional position such as ¼, ⅛, or the like may be used, i.e. interpolated using the corresponding interpolation filter.

The same definition of the window size is also applicable to the case of padding for interpolation filtering for predictor generation. In particular, vertical and horizontal size (i.e. in x and y directions) are determined by the vertical and horizontal length of the interpolation filter that is used for determining the predictor.

Figure 17:
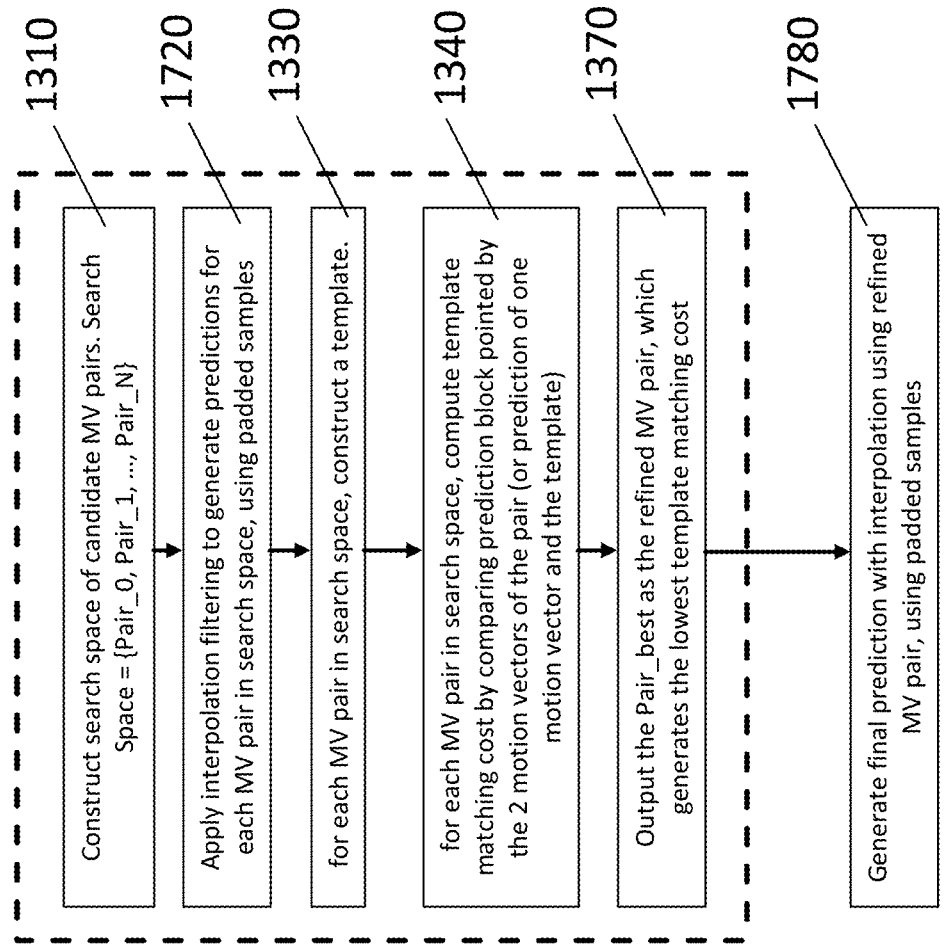
FIG. 17 is a flow diagram illustrating the motion vector refinement and obtaining prediction according to the exemplary embodiments of FIG. 13.

FIG. 17 is a flow diagram showing the processing illustrated in FIG. 13 in more detail. The flow diagram of FIG. 17 differs from the flow diagram of FIG. 12 showing a conventional process in that steps 1320 and 1380 are replaced with steps 1720 and 1780, respectively. These steps differ from the respective steps of FIG. 12 in that for both the interpolation filtering for generating candidate prediction blocks in the reference picture(s) in order to perform bilateral or template matching as well as the interpolation filtering for generating the final prediction, padding with the use of replacement samples is applied.

The processing circuitry described with reference to FIG. 7 may be employed in an encoder and/or decoder as shown in FIGS. 1 and 2.

In particular, an encoding apparatus may be provided for encoding video images split to prediction blocks into a bitstream, the encoding apparatus comprising: the apparatus for determination of a motion vector for a prediction block as described above including the processing circuitry; and an encoding circuitry for encoding difference between the prediction block and the predictor given by a prediction block in a position specified by the determined motion vector and for generating bitstream including the encoded difference and the initial motion vector.

Further units and functions of the encoder described above with reference to FIG. 1 may also be provided or implemented in the processing circuitry.

Correspondingly, a decoding apparatus may be provided for decoding from a bitstream video images split to prediction blocks, the decoding apparatus comprising: a parsing unit for parsing from the bitstream an initial motion vector and an encoded difference between a prediction block and a predictor given by a prediction block in a position specified by a refined motion vector; the apparatus for determination of the refined motion vector for the prediction block as described above including the processing circuitry; and a decoding circuitry for reconstructing the prediction block as a sum of the parsed difference and the predictor given by the prediction block in the position based on by the refined motion vector. For example, the predictor may be directly given by the position of the refined motion vector. However, there may be further processing steps of obtaining the motion vector of the current prediction block which may further change the motion vector (such as filtering, clipping, further refinement or the like).

Further units and functions of the decoder described above with reference to FIG. 2 may also be provided or implemented in the processing circuitry.

Moreover, the embodiments of the invention were described from the point of view of the apparatus with the processing circuitry to perform the motion vector refinement. However, the present disclosure is not limited thereto but also provides the corresponding methods which include the processing steps corresponding to those for the performing of which the above described processing circuitry is configured.

The taps correspond to the filter coefficients. The tap-size corresponds to filter order. Here, it is assumed that the filter is a linear filter. In some examples, the filter may be symmetric, i.e. having symmetric coefficients. However, the present disclosure is not limited to symmetric filters or linear filters or any kind of filters. In general, the fractional positions may be obtained in any way based on the adjacent samples.

A method according to an embodiment determines a motion vector for a prediction block with the following steps illustrated in FIG. 19. In step 1410 an initial motion vector and a template for the prediction block is obtained, followed by determining a refinement of the initial motion vector by template matching with said template in a search space. The search space is located on a position given by the initial motion vector. The memory access window is determined in 1420. It is noted that this does not have to be performed explicitly. The memory access window may be predefined and known. Thus this step is for illustration to indicate that the knowledge of the memory access window size is known. Then the template matching is performed in steps 1430-1490.

The template or bilateral matching accesses integer sample positions within a predetermined window, the predetermined window including said search space and further integer sample positions accessible for the template or bilateral matching; and replaces at least one integer sample position located out of the window by a replacement value which is based on at least one sample within said window. The accessed integer sample position values as well as the replacement values are used to perform the template matching. This is shown in FIG. 19: The template or bilateral matching is performed for all positions in the search space. In step 1430 it is tested whether the template or bilateral matching on the current position requires a sample or samples which is/are out of the memory access window. If affirmative (yes in step 1430), then the padding as described above is performed for the sample or samples out of the window in step 1440. After this step, the template or bilateral matching (i.e. search) is performed in step 1450 at the current position using the padded samples. Alternatively, if none of the necessary samples is out of the window (No in step 1430), the template or bilateral matching (i.e. search) is performed in step 1450 at the current position using the available samples. If the current position is the last position in the search space to be tested (Yes in step 1460), then the template matching ends. Otherwise (No in step 1460), then the next position is obtained in step 1470 and the template matching continues as described above for the new position in step 1430.

After the end of the template matching, the best matching position is identified (e.g. as stored position with the lowest cost).

FIG. 20 illustrates an alternative exemplary approach for motion vector refinement and predictor generation applicable within the framework of embodiments of the present invention. The difference between this approach and the approach of FIG. 13 resides in that in case of FIG. 20 interpolation filtering with padding is applied only for the final generation of the predictor using the refined motion vector (pair). This is Step 5 in FIG. 20 corresponding to Step 4 in FIG. 13.

On the other hand, no interpolation filtering with padding is applied in the motion vector refinement (search), i.e. Step 2 of FIG. 13. Instead, the approach of FIG. 20 performs a rounding operation in order to round the coordinate is to the closest integer point in case the initial motion vector (or a plurality of initial candidate motion vectors forming an initial search space) to the closest integer point (Step 2 of FIG. 20). This rounding operation is equivalent to a shift with a predetermined vector indicated as MV_round_diff that describes a rounding direction. Performance of the rounding operation ensures that the search space is modified so as to obtain a modified search space having only points with integer coordinates. As a consequence, the following Step 3 for obtaining the best matching integer point by bilateral (or template) matching can be performed on integer coordinates so that no interpolation filtering is necessary for generating the predictions for template/bilateral matching.

Additionally, FIG. 20 includes Step 4. This step is optional. In Step 4, after the best matching integer point in the modified search space have been obtained in Step 3, the application of rounding is reverted so as to obtain a final refined motion vector in the (initial) search space. In other words, the opposite shift vector to that of Step 2 is applied to the best matching (refined) motion vector resulting from Step 3. If optional Step 4 is included, the final prediction is then obtained on the basis of the refined motion vector resulting from Step 4. Alternatively, Step 3 is skipped and Step 5 is directly applied to the motion vector resulting from Step 3. Still alternatively, it is possible to decide, on the basis of a predetermined condition, whether to include or to skip Step 4.

A flow diagram corresponding to the approach of FIG. 20 is shown in FIG. 21. Again, the flow diagram has been made for the case of motion vector pairs rather than single motion vectors which are used for simplification of illustration purposes in FIG. 20.

Initial step 1310 is the same as in FIG. 20. Subsequent step 2115 corresponds to the rounding operation in Step 2 of FIG. 20. The processing shown herein is insofar a generalization, as the modification of the initial search space is not limited to a rounding operation, but it is here, more generally, said that for each motion vector pair in the initial search space, a representative motion vector pair is generated. The rounding operation of FIG. 20 is a special case of this mapping of the initial search space motion vectors to representatives.

The following steps, 2130 (optional for template matching) and 2140 are the same as in FIG. 17, with the only difference that the respective operations are performed with the representative motion vectors in the modified search space. Steps 2150 and 2160 correspond to Step 4 of FIG. 20. Step 2150 describes setting the representative motion vector pair minimizing the template matching cost (or bilateral matching cost) as Pair_best_rep.

Step 2160 (optional) corresponds to the reversion of the rounding operation illustrated in Step 4 of FIG. 20. In the following step (1370), a motion vector (pair) of the original search space is output as a motion vector for the prediction block. Steps 1370 and 1780 are the same as in FIG. 17.

Moreover an encoding method is provided for encoding video images split to prediction blocks into a bitstream, the encoding method comprising the steps of determining a motion vector for a prediction block according to any of methods described above; as well as encoding difference between the prediction block and the predictor given by a prediction block in a position based on the determined motion vector and for generating bitstream including the encoded difference and the initial motion vector.

The encoding method may further include steps described with reference to functions of blocks in FIG. 1.

Still further, a decoding method is provided for decoding from a bitstream video images split to prediction blocks, the decoding method comprising: parsing from the bitstream an initial motion vector and an encoded difference between a prediction block and a predictor given by a prediction block in a position specified by a refined motion vector; determining the refined motion vector for the prediction block according to any of methods mentioned above; and reconstructing the prediction block as a sum of the parsed difference and the predictor given by the prediction block in the position specified by the refined motion vector.

The decoding method may further include steps described with reference to functions of blocks in FIG. 2.

However, it is noted that FIGS. 1 and 2 are not to limit the present disclosure. They merely provide a non-limiting example of an implementation of present invention within the existing encoder and/or decoder.

The motion vector determination with sample padding as described above can be implemented as a part of encoding and/or decoding of a video signal (motion picture). However, the motion vector determination may also be used for other purposes in image processing such as movement detection, movement analysis, or the like without limitation to be employed for encoding/decoding.

The motion vector determination may be implemented as an apparatus. Such apparatus may be a combination of a software and hardware. For example, the motion vector determination may be performed by a chip such as a general purpose processor, or a digital signal processor (DSP), or a field programmable gate array (FPGA), or the like. However, the present invention is not limited to implementation on a programmable hardware. It may be implemented on an application-specific integrated circuit (ASIC) or by a combination of the above mentioned hardware components.

The motion vector determination may also be implemented by program instructions stored on a computer readable medium. The program, when executed, causes the computer to perform the steps of the above described methods. The computer readable medium can be any medium on which the program is stored such as a DVD, CD, USB (flash) drive, hard disc, server storage available via a network, etc.

The encoder and/or decoder may be implemented in various devices including a TV set, set top box, PC, tablet, smartphone, or the like, i.e. any recording, coding, transcoding, decoding or playback device. It may be a software or an app implementing the method steps and stored/run on a processor included in an electronic device as those mentioned above.

Summarizing, the present disclosure relates to motion vector determination using template or bilateral matching and predictor generation based on the motion vector. The template or bilateral matching and/or the predictor generation use interpolation filtering. The interpolation filtering operation accesses integer sample positions within a window, the window including said search space and further integer sample positions accessible for the template matching, pads at least one integer sample position located out of the window by a padded sample value which is based on at least one sample within said window, and uses the accessed integer sample position values as well as the padded sample values to perform the template or bilateral matching and/or predictor generation.

Further embodiments of the present invention are provided in the following. It should be noted that the numbering used in the following section does not necessarily need to comply with the numbering used in the previous sections.

Embodiment 1. An encoding apparatus for encoding a prediction block of a video image into a bitstream (171), the encoding apparatus comprising:
  processing circuitry (600) configured to
  determine a motion vector for a prediction block (165) by:
    obtaining at least one initial motion vector; and
    determining a refinement of the initial motion vector on the basis of a search space of candidate motion vectors, so as to obtain a refined motion vector, wherein said search space is located on a position (810) given by the initial motion vector;
  encode a difference (105) between the prediction block and a predictor given by a prediction block in a position based on the determined motion vector and for generating a bitstream (171) including the encoded difference and the initial motion vector; and
  determine the predictor according to the motion vector using interpolation filtering with an interpolation filter, wherein said interpolation filtering
  accesses sample values at integer sample positions within a predetermined window,
  replaces at least one sample value at an integer sample position located out of the window by a replacement value which is based on at least one sample within said window, and
  uses the accessed integer position sample values as well as the replacement values to perform the interpolation filtering.

Embodiment 2. A decoding apparatus for decoding from a bitstream (171) video images split to prediction blocks, the decoding apparatus comprising processing circuitry configured to:
  parse from the bitstream an initial motion vector and an encoded difference between a prediction block and a predictor given by a prediction block in a position specified by a refined motion vector;
  determine a motion vector for a prediction block by:
    obtaining at least one initial motion vector; and
    determining a refinement of the initial motion vector on the basis of a search space of candidate motion vectors, so as to obtain a refined motion vector, wherein said search space is located on a position (810) given by the initial motion vector; and
  reconstruct the prediction block as a sum of the parsed difference and the predictor given by the prediction block in the position specified by the refined motion vector determined by the processing circuitry (600) for determining a motion vector;
  wherein said processing circuitry is further configured to determine the predictor according to the refined motion vector using interpolation with an interpolation filter, wherein said interpolation
  accesses sample values at integer sample positions within a predetermined window,
  replaces at least one sample value at an integer sample position located out of the window by a replacement value which is based on at least one sample within said window, and
  uses the accessed integer sample position values as well as the replacement values to perform the interpolation.

Embodiment 3. The apparatus according to embodiment 1 or 2, wherein the replacement value is determined by mirroring with respect to the axis of the interpolation filter the value of the corresponding assessed integer sample position.

Embodiment 4. The apparatus according to any of embodiments 1 to 3, wherein the interpolation filter is a one-dimensional or separable two-dimensional filter.

Embodiment 5. The apparatus according to any of embodiments 1 to 4, wherein the window is formed by all integer sample positions accessible for obtaining the predictor given by a prediction block in a position specified by the initial motion vector.

Embodiment 6. The apparatus according to any of embodiments 1 to 5, wherein the window is defined by its vertical and/or horizontal size with respect to at least one of:
  a block with a size of the prediction block located on the initial motion vector position,
  the initial motion vector position, and
  the vertical and horizontal length of the interpolation filter that is used for determining the predictor.

Embodiment 7. The apparatus according to any of embodiments 1, 2 or 4 to 6, wherein the replacement value is determined to be equal to the value on a closest of the accessed integer sample positions.

Embodiment 8. The apparatus according to any of embodiments 1 to 7, wherein the number of sample values to be replaced depends on the difference between the initial motion vector and the refined motion vector.

Embodiment 9. The apparatus according to any of the preceding embodiments, wherein said processing circuitry (600) is configured to determine the refinement of the initial motion vector by template matching with a template or bilateral matching, wherein
  said template or bilateral matching:
    accesses sample values at integer sample positions within a further predetermined window (1120), the further predetermined window (1120) including said search space and further integer sample positions accessible for the template or bilateral matching,
    replaces at least one sample value (1030) at an integer sample position located out of the further window by a replacement value which is based on at least one sample within said further window, and uses the accessed integer sample position values as well as the replacement values to perform the template or bilateral matching.

Embodiment 10. The apparatus according to embodiment 9, wherein
said search space includes at least one fractional sample position (1, 2, 6) with a value obtained by interpolation filtering with a filter of a predefined tap-size; and
the interpolation filtering uses said accessed integer sample position values and the at least one replacement value to obtain said at least one fractional sample position value.

Embodiment 11. The apparatus according to embodiment 10, wherein the replacement value used in the template or bilateral matching is determined by mirroring with respect to the axis of the filter the value of the corresponding accessed integer sample position.

Embodiment 12. The apparatus according to embodiment 9 or 10, wherein the replacement value used in the template or bilateral matching is determined to be equal to the value on a closest of the accessed integer sample positions.

Embodiment 13. The apparatus according to any of embodiments 9 to 12, wherein the further predetermined window (1120) is defined by its vertical and/or horizontal size with respect to at least one of:
the search space,
a block with a size of the prediction block located on the initial motion vector position,
the initial motion vector position.

Embodiment 14. The apparatus according to any of embodiments 9 to 13, wherein said further predetermined window (1120) is the same as said predetermined window.

Embodiment 15. The apparatus according to any of embodiments 1 to 14, wherein said refinement is determined by bilateral matching and said processing circuitry is configured to obtain at least two initial motion vectors pointing to positions in different reference pictures (Ref0, Ref1) and forming a pair of initial motion vectors (Pair_0, Pair_1, . . . , Pair_N).

Embodiment 16. The apparatus according to any of embodiments 1 to 14, wherein said refinement is determined by template matching, said processing circuitry being further configured to
obtain a template for the prediction block and
determine the refinement of the initial motion vector by template matching with said template in said search space.

Embodiment 17. An encoding method for encoding video images split to prediction blocks into a bitstream, the encoding method comprising:
determining a motion vector for a prediction block, including the steps of
obtaining (1310, 1410) at least one initial motion vector; and
determining (1320, 1330, 1340, 1720; 2115, 2120, 2130, 2140, 2150, 2160) a refinement of the initial motion vector on the basis of a search space of candidate motion vectors, so as to obtain a refined motion vector, wherein said search space is located on a position given by the initial motion vector;
encoding a difference between the prediction block and a predictor given by a prediction block in a position based on the determined motion vector and for generating a bitstream including the encoded difference and the initial motion vector; and
determining (1780) the predictor according to the motion vector using interpolation filtering with an interpolation filter, wherein said interpolation filtering
accesses sample values at integer sample positions within a predetermined window,
replaces at least one sample value at an integer sample position located out of the window by a replacement value which is based on at least one sample within said window, and
uses the accessed integer position sample values as well as the replacement values to perform the interpolation filtering.

Embodiment 18. A decoding method for decoding from a bitstream video images split to prediction blocks, the decoding comprising the steps of
parsing from the bitstream an initial motion vector and an encoded difference between a prediction block and a predictor given by a prediction block in a position specified by a refined motion vector;
determining a motion vector for a prediction block, including the steps of
obtaining (1310, 1410) at least one initial motion vector; and
determining (1320, 1330, 1340, 1720; 2115, 2120, 2130, 2140, 2150, 2160) a refinement of the initial motion vector on the basis of a search space of candidate motion vectors, so as to obtain a refined motion vector, wherein said search space is located on a position given by the initial motion vector;
reconstructing the prediction block as a sum of the parsed difference and the predictor given by the prediction block in the position specified by the refined motion vector determined by the step of determining a motion vector; and
determining (1780) the predictor according to the refined motion vector using interpolation with an interpolation filter, wherein said interpolation
accesses sample values at integer sample positions within a predetermined window,
replaces at least one sample value at an integer sample position located out of the window by a replacement value which is based on at least one sample within said window, and
uses the accessed integer position sample values as well as the replacement values to perform the interpolation.

Embodiment 19. The method according to embodiment 17 or 18, wherein the replacement value is determined by mirroring with respect to the axis of the interpolation filter the value of the corresponding assessed integer sample position.

Embodiment 20. The method according to any of embodiments 17 to 19, wherein the interpolation filter is a one-dimensional or separable two-dimensional filter.

Embodiment 21. The method according to any of embodiments 17 to 20, wherein the window is formed by all integer sample positions accessible for obtaining the predictor given by a prediction block in a position specified by the initial motion vector.

Embodiment 22. The method according to any of embodiments 17 to 21, wherein the window is defined by its vertical and/or horizontal size with respect to at least one of:
a block with a size of the prediction block located on the initial motion vector position,
the initial motion vector position, and
the vertical and horizontal length of the interpolation filter that is used for determining the predictor.

Embodiment 23. The method according to any of embodiments 17, 18 or 20 to 22, wherein the replacement value is determined to be equal to the value on a closest of the accessed integer sample positions.

Embodiment 24. The method according to any of embodiments 17 to 23, wherein the number of sample values to be replaced depends on the difference between the initial motion vector and the refined motion vector.

Embodiment 25. The method according to any of embodiments 17 to 24, wherein said step (1320, 1330, 1340, 1720; 2115, 2120, 2130, 2140, 2150, 2160) of determining a refinement determines the refinement of the initial motion vector by template matching with a template or bilateral matching, wherein
said template or bilateral matching:
accesses sample values at integer sample positions within a further predetermined window, the further predetermined window including said search space and further integer sample positions accessible for the template or bilateral matching,
replaces (1440) at least one sample value at an integer sample position located out of the further window by a replacement value which is based on at least one sample within said further window, and
uses (1450) the accessed integer sample position values as well as the replacement values to perform the template or bilateral matching.

Embodiment 26. The method according to embodiment 25, wherein
said search space includes at least one fractional sample position with a value obtained by interpolation filtering with a filter of a predefined tap-size;
and the interpolation filtering uses said accessed integer sample position values and the at least one replacement value to obtain said at least one fractional sample position value.

Embodiment 27. The method according to embodiment 26, wherein the replacement value used in the template or bilateral matching is determined by mirroring with respect to the axis of the filter the value of the corresponding assessed integer sample position.

Embodiment 28. The method according to embodiment 26 or 27, wherein the replacement value used in the template or bilateral matching is determined to be equal to the value on a closest of the accessed integer sample positions.

Embodiment 29. The method according to any of embodiments 25 to 28, wherein the further predetermined window is defined by its vertical and/or horizontal size with respect to at least one of:
the search space,
a block with a size of the prediction block located on the initial motion vector position,
the initial motion vector position.

Embodiment 30. The method according to any of embodiments 25 to 29, wherein said further predetermined window is the same as said predetermined window.

Embodiment 31. The method according to any of embodiments 17 to 30, wherein said refinement is determined by bilateral matching and said obtaining step obtaining at least two initial motion vectors pointing to positions in different reference pictures and forming a pair of initial motion vectors.

Embodiment 32. The method according to any of embodiments 17 to 31, wherein said refinement is determined by template matching and said step of determining a motion vector further including obtaining (1330; 2130) a template for the prediction block and
determining (1340; 2140) the refinement of the initial motion vector by template matching with said template in said search space.

Embodiment 33. A computer readable medium storing instructions which when executed on a processor cause the processor to perform the method according to any of embodiments 17 to 32.

The invention claimed is:

1. An encoding apparatus for determining a predictor for encoding a block of a video image, the encoding apparatus comprising:
a memory storing instructions; and
a processor configured to execute the instructions to:
obtain an initial motion vector for the block;
perform a search to obtain a refined motion vector for the block based on the initial motion vector; and
determine, after the search, a predictor for the block according to the refined motion vector using interpolation filtering with an interpolation filter,
wherein the interpolation filtering comprises using at least one sample value of an integer sample position located inside a window and a padded sample value for an integer sample position located outside the window,
wherein the padded sample value is based on at least one sample value of a sample located inside the window, and
wherein the window is defined as an extension by a number of rows and a number of columns of a block located on a position of the initial motion vector.

2. A decoding apparatus for determining a predictor for decoding a block of a video image, the decoding apparatus comprising
a memory storing instructions; and
a processor configured to execute the instructions to:
obtain an initial motion vector for the block;
perform a search to obtain a refined motion vector for the prediction block based on the initial motion vector; and
determine, after the search, a predictor for the block according to the refined motion vector using interpolation filtering with an interpolation filter,
wherein the interpolation filtering comprises using at least one sample value of an integer sample position located inside a window and a padded sample value for an integer sample position located outside the window,
wherein the padded sample value is based on at least one sample value of a sample located inside the window, and
wherein the window is defined as an extension by a number of rows and a number of columns of a block located on a position of the initial motion vector.

3. An encoding method for determining a predictor for encoding a block of a video image, the encoding method comprising:
obtaining an initial motion vector for the block;
performing a search to obtain a refined motion vector for the block based on the initial motion vector; and
determining, after the search, a predictor for the block according to the refined motion vector using interpolation filtering with an interpolation filter,
wherein the interpolation filtering comprises using at least one sample value of an integer sample position located inside a window and a padded sample value for an integer sample position located outside the window, wherein the padded sample value is based on at least one sample value of a sample located inside the window, and wherein the window is defined as an extension by a number of rows and a number of columns of a block located on a position of the initial motion vector.

4. A decoding method for determining a predictor for decoding a block of a video image, the decoding method comprising:

obtaining an initial motion vector for the block;

performing a search to obtain a refined motion vector for the prediction block based on the initial motion vector; and determining, after the search, a predictor for the block according to the refined motion vector using interpolation filtering with an interpolation filter, wherein the interpolation filtering comprises using at least one sample value of an integer sample position located inside a window and a padded sample value for an integer sample position located outside the window, wherein the padded sample value is based on at least one sample value of a sample located inside the window, and wherein the window is defined as an extension by a number of rows and a number of columns of a block located on a position of the initial motion vector.

5. The decoding method according to claim 4, wherein the search comprises determining a refinement value for the initial motion vector based on a search space of candidate motion vectors, and wherein the refined motion vector is determined based on the initial motion vector and the refinement value.

6. The decoding method according to claim 5, wherein the search space is located on a position defined by the initial motion vector.

7. The decoding method according to claim 4, further comprising obtaining a difference between the block and the predictor.

8. The decoding method according to claim 7, further comprising reconstructing the block based on the predictor and the difference between the block and the predictor.

9. The decoding method according to claim 4, wherein the padded sample value is determined by mirroring, with respect to an axis of the interpolation filter, a value of the corresponding integer sample position.

10. The decoding method according to claim 4, wherein the interpolation filter is a one-dimensional filter or a separable two-dimensional filter.

11. The decoding method according to claim 4, wherein the window is formed by all integer sample positions accessible for obtaining the predictor in a position specified by the initial motion vector.

12. The decoding method according to claim 4, wherein the window is defined by its vertical and/or horizontal size with respect to the vertical and horizontal length of the interpolation filter that is used for determining the predictor.

13. The decoding method according to claim 4, wherein the padded sample value for the integer sample position outside of the window is determined to be equal to the sample value of the at least one used integer sample position located inside the window, wherein the sample value of the at least one used integer sample position located inside the window is closest to the integer sample position located outside the window.

14. The decoding method according to claim 4, wherein the number of sample values to be padded depends on the difference between the initial motion vector and the refined motion vector.

15. The decoding method according to claim 5, wherein determining the refinement of the initial motion vector comprises template matching with a template or bilateral matching, wherein the template or bilateral matching comprises:

accessing sample values at integer sample positions within a further window, the further window including said search space and further integer sample positions accessible for the template or bilateral matching, padding at least one sample value at an integer sample position located out of the further window by a padded sample value which is based on at least one sample within said further window, and using the accessed integer sample position values as well as the padded sample values to perform the template or bilateral matching.

16. The decoding method according to claim 15, wherein:

the search space includes at least one fractional sample position with a value obtained by interpolation filtering with a filter of a predefined tap-size;

and the interpolation filtering uses said accessed integer sample position values and the at least one padded sample value to obtain said at least one fractional sample position value.

17. The decoding method according to claim 16, wherein the padded sample value used in the template or bilateral matching is determined by mirroring with respect to an axis of a filter the value of the corresponding integer sample position.

18. The decoding method according to claim 16, wherein the padded sample value used in the template or bilateral matching is determined to be equal to the value on a closest of the accessed integer sample positions.

19. The decoding method according to claim 16, wherein the further window is defined by its vertical and/or horizontal size with respect to the search space.

20. The decoding method according to claim 16, wherein the further window is the same as said window.

21. The decoding method according to claim 5, wherein the refinement value is determined by bilateral matching and obtaining at least two initial motion vectors pointing to positions in different reference pictures and forming a pair of initial motion vectors.

22. The decoding method according to claim 5, wherein the refinement value is determined by template matching and determining the motion vector further comprises:

obtaining a template for the block; and determining the refinement value to the initial motion vector by template matching with the template in the search space.

23. A non-transitory computer readable medium storing instructions which when executed on a processor cause the processor to perform the method according to claim 4.

* * * * *